US010999481B2

(12) United States Patent
Kishine et al.

(10) Patent No.: US 10,999,481 B2
(45) Date of Patent: May 4, 2021

(54) IMAGE PROCESSING APPARATUS, IMAGING SYSTEM, IMAGE PROCESSING METHOD, AND RECORDING MEDIUM

(71) Applicant: FUJIFILM Corporation, Tokyo (JP)

(72) Inventors: Yasunobu Kishine, Saitama (JP); Yosuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/681,701

(22) Filed: Nov. 12, 2019

(65) Prior Publication Data

US 2020/0084350 A1 Mar. 12, 2020

Related U.S. Application Data

(63) Continuation of application No. PCT/JP2018/014981, filed on Apr. 10, 2018.

(30) Foreign Application Priority Data

Jun. 1, 2017 (JP) .............................. JP2017-109269

(51) Int. Cl.
*H04N 5/225* (2006.01)
*G02B 5/18* (2006.01)
(Continued)

(52) U.S. Cl.
CPC .............. *H04N 5/2254* (2013.01); *G02B 3/08* (2013.01); *G02B 5/1876* (2013.01); *H04N 5/232* (2013.01)

(58) Field of Classification Search
CPC ...... H04N 5/2254; H04N 5/225; H04N 5/232; G02B 5/1876; G02B 3/08;
(Continued)

(56) References Cited

U.S. PATENT DOCUMENTS 6,246,796 B1 * 6/2001 Horikoshi ............ G03H 1/0005
375/E7.09
8,559,014 B2 * 10/2013 Jeong .................... G02B 27/58
356/491
(Continued)

FOREIGN PATENT DOCUMENTS

JP 2018055831 3/2018
WO 2016203573 12/2016

OTHER PUBLICATIONS

Office Action of Japan Counterpart Application, with English translation thereof, dated Jul. 1, 2020, pp. 1-5.
(Continued)

*Primary Examiner* — Hung H Lam
(74) *Attorney, Agent, or Firm* — JCIPRNET

(57) ABSTRACT

An image processing apparatus according to one aspect of the present invention includes a projected image input unit that inputs a projected image formed by light incident on a Fresnel zone plate from a subject, a complex image generation unit that generates a complex image including an image of a real part and an image of an imaginary part by multiplying the projected image with each of a first Fresnel zone pattern and a second Fresnel zone pattern having the same local spatial frequency in each region and a different phase of the local spatial frequency with respect to the first Fresnel zone pattern, and a Fourier transformation unit that reconstructs an image of a spatial domain by performing two-dimensional complex Fourier transformation on the complex image.

20 Claims, 15 Drawing Sheets

(51) Int. Cl.
*G02B 3/08* (2006.01)
*H04N 5/232* (2006.01)

(58) Field of Classification Search
CPC . G06T 2207/20056; G06T 2207/20212; G06T 5/50
See application file for complete search history.

(56) References Cited

U.S. PATENT DOCUMENTS

| | | | | |
|---|---|---|---|---|
| 10,423,002 | B2* | 9/2019 | Shimano | G02B 27/4205 |
| 10,649,118 | B2* | 5/2020 | Tajima | H04N 5/23235 |
| 2010/0060962 | A1* | 3/2010 | Rosen | G03H 1/06 |
| | | | | 359/29 |
| 2014/0049451 | A1* | 2/2014 | Sugiyama | G02B 27/01 |
| | | | | 345/8 |
| 2018/0136480 | A1 | 5/2018 | Shimano | |
| 2019/0278006 | A1* | 9/2019 | Tajima | G02B 27/4205 |
| 2019/0361257 | A1 | 11/2019 | Shimano | |

OTHER PUBLICATIONS

"International Search Report (Form PCT/ISA/210) of PCT/JP2018/014981", dated Jul. 3, 2018, with English translation thereof, pp. 1-3.

"Written Opinion of the International Searching Authority (Form PCT/ISA/237) of PCT/JP2018/014981", dated Jul. 3, 2018, with English translation thereof, pp. 1-8.

Hitachi Ltd., "Development of lensless camera technology enabling easy focus adjustment after motion picture imaging", with English concise description of relevance, Nov. 15, 2016, Available at: "http://www.hitachi.co.jp/New/cnews/month/2016/11/1115.html".

Yusuke Nakamura et al., "Lensless Light-field Imaging with Fresnel Zone Aperture", The Institute of Image Informationand Television Engineers Technical Report, vol. 40, No. 40, Nov. 17, 2016, pp. 1-4.

"Search Report of Europe Counterpart Application", dated Mar. 6, 2020, pp. 1-5.

Kazuyuki Tajima et al., "Lensless light-field imaging with multi-phased fresnel zone aperture", 2017 IEEE International Conference on Computational Photography (ICCP), May 12, 2017, pp. 1-7.

* cited by examiner

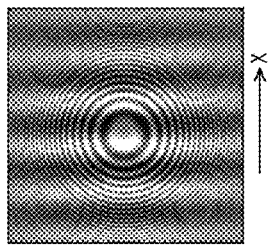
FIG. 1A FIG. 1B FIG. 1C FIG. 1D FIG. 1E
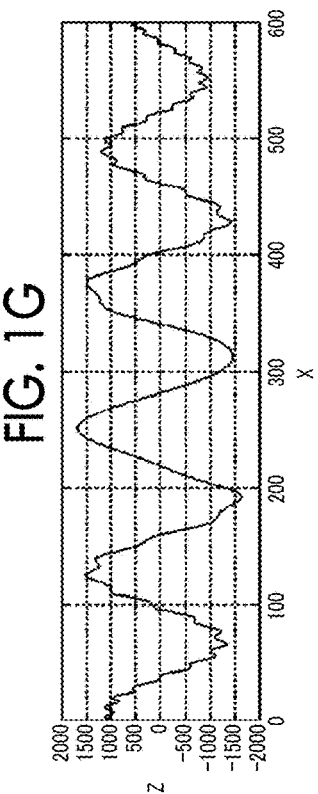
FIG. 1F
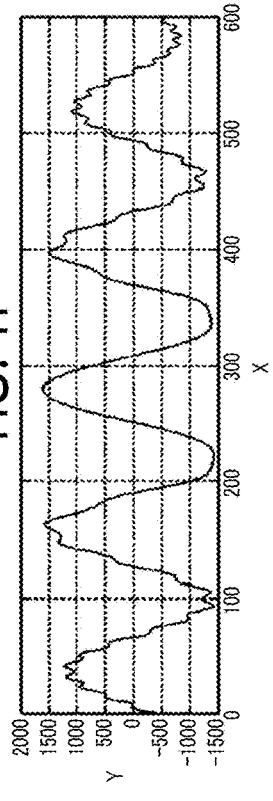
FIG. 1G
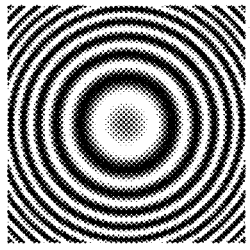
FIG. 1I
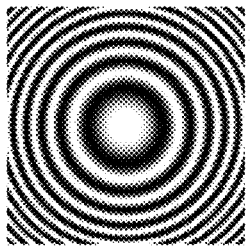
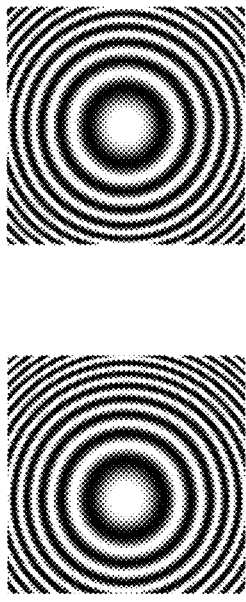
FIG. 1H FIG. 7A
FIG. 7B
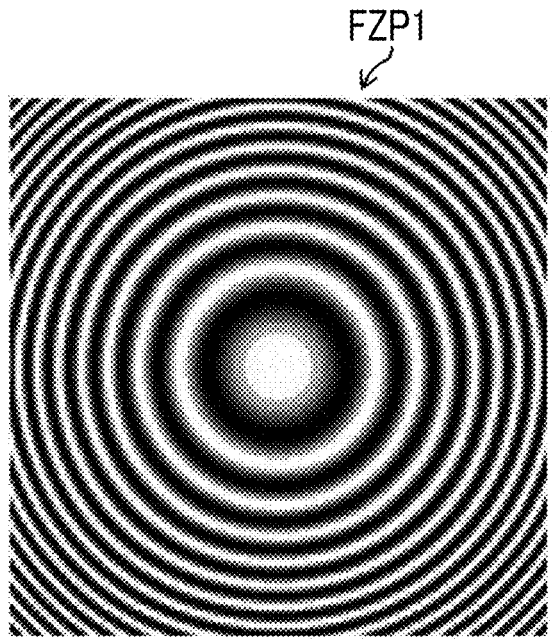
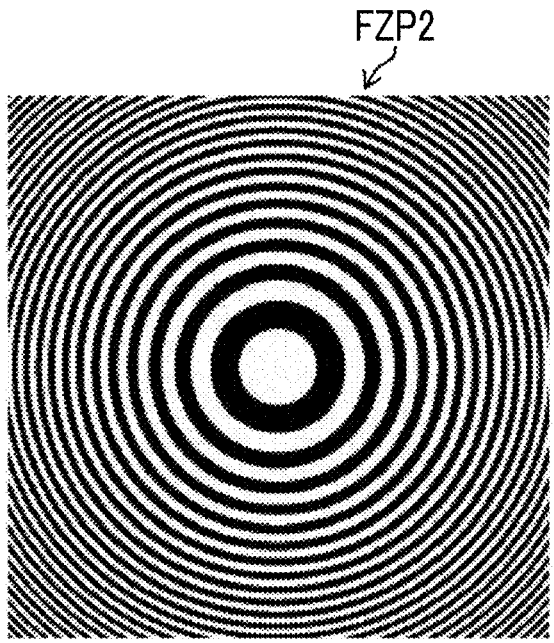
FIG. 8A
FIG. 8B
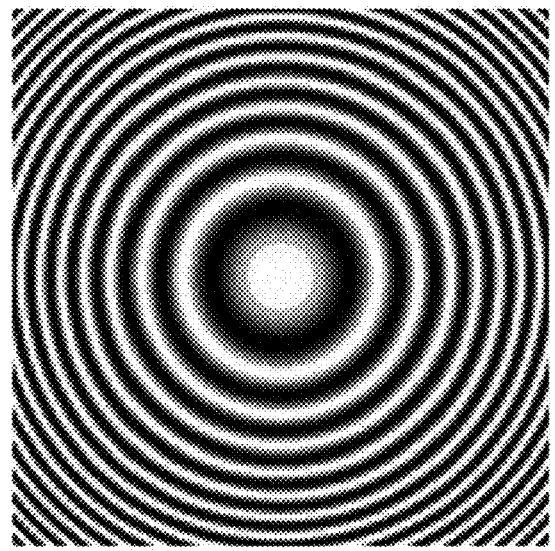
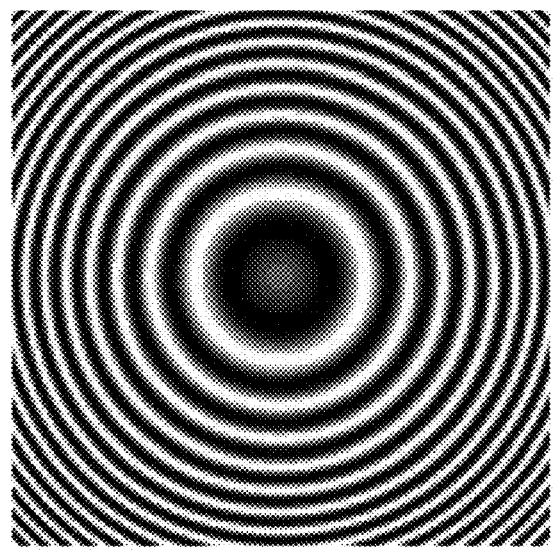

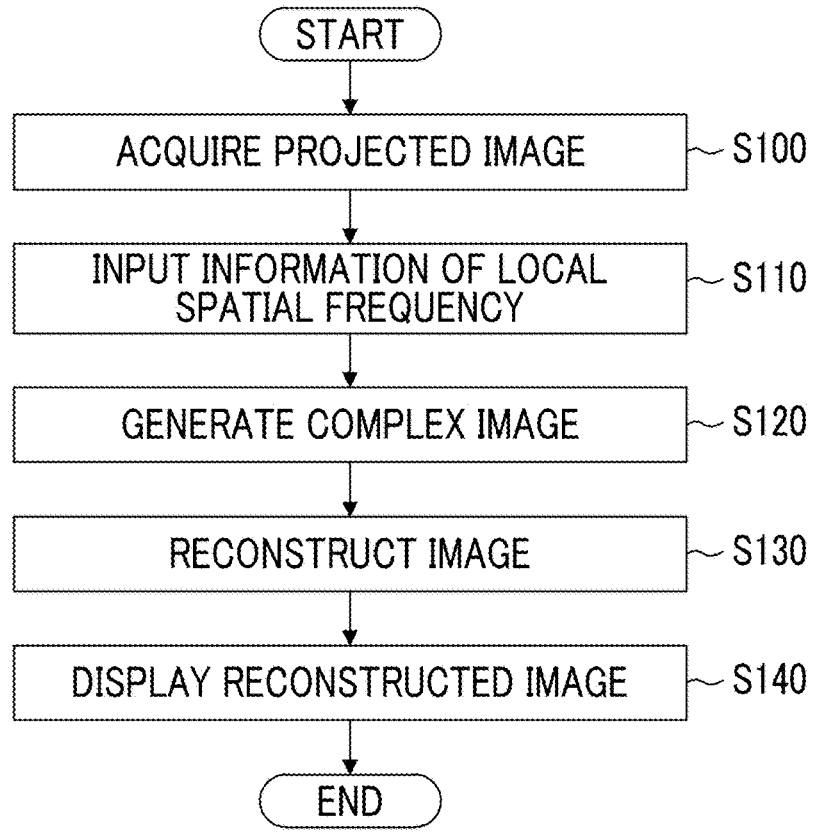
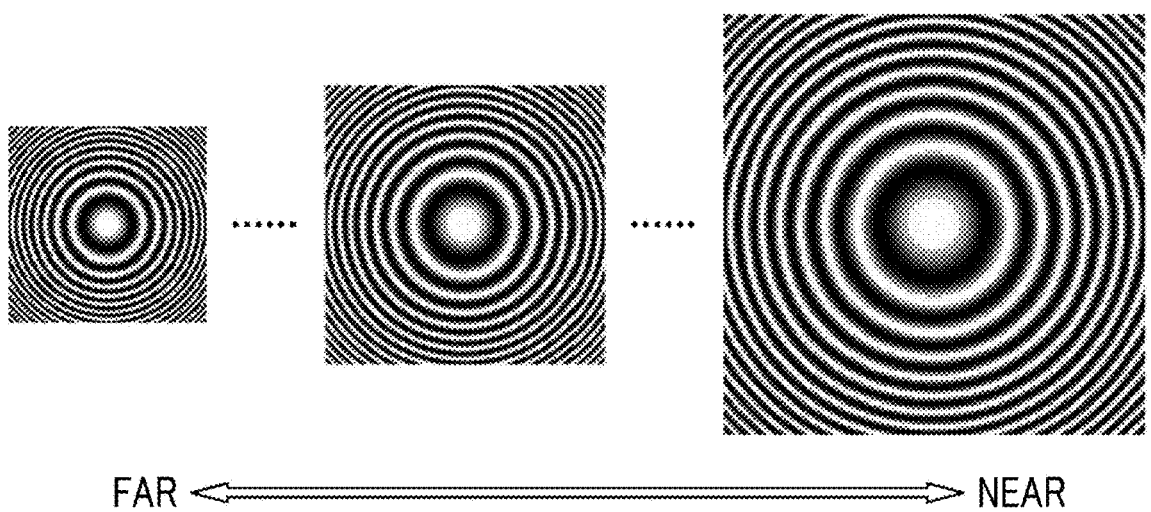

FIG. 11

| CASE | PHASE AT CENTER (deg) | | |
|---|---|---|---|
| | FRESNEL ZONE PLATE FOR IMAGING | FRESNEL ZONE PATTERN FOR SUPERIMPOSING (REAL PART) | FRESNEL ZONE PATTERN FOR SUPERIMPOSING (IMAGINARY PART) |
| CONDITION 1 (COMPARATIVE EXAMPLE 1) | 0 | 0 | 0 |
| CONDITION 2 (COMPARATIVE EXAMPLE 2) | 0 | 0 | 10 |
| CONDITION 3 (COMPARATIVE EXAMPLE 3) | 0 | 0 | 20 |
| CONDITION 4 (COMPARATIVE EXAMPLE 4) | 0 | 0 | 30 |
| CONDITION 5 (COMPARATIVE EXAMPLE 5) | 0 | 0 | 40 |
| CONDITION 6 (COMPARATIVE EXAMPLE 6) | 0 | 0 | 50 |
| CONDITION 7 (COMPARATIVE EXAMPLE 7) | 0 | 0 | 60 |
| CONDITION 8 (EXAMPLE 1) | 0 | 0 | 70 |
| CONDITION 9 (EXAMPLE 2) | 0 | 0 | 75 |
| CONDITION 10 (EXAMPLE 3) | 0 | 0 | 80 |
| CONDITION 11 (EXAMPLE 4) | 0 | 0 | 90 |
| CONDITION 12 (EXAMPLE 5) | 0 | 0 | 100 |
| CONDITION 13 (EXAMPLE 6) | 0 | 0 | 105 |
| CONDITION 14 (EXAMPLE 7) | 0 | 0 | 110 |
| CONDITION 15 (COMPARATIVE EXAMPLE 8) | 0 | 0 | 120 |
| CONDITION 16 (COMPARATIVE EXAMPLE 9) | 0 | 0 | 130 |
| CONDITION 17 (COMPARATIVE EXAMPLE 10) | 0 | 0 | 140 |
| CONDITION 18 (COMPARATIVE EXAMPLE 11) | 0 | 0 | 150 |
| CONDITION 19 (COMPARATIVE EXAMPLE 12) | 0 | 0 | 160 |
| CONDITION 20 (COMPARATIVE EXAMPLE 13) | 0 | 0 | 170 |
| CONDITION 21 (COMPARATIVE EXAMPLE 14) | 0 | 0 | 180 |
| CONDITION 22 (EXAMPLE 8) | 0 | 50 | 140 |
| CONDITION 23 (EXAMPLE 9) | 50 | 50 | 140 |
| CONDITION 24 (EXAMPLE 10) | 320 | 50 | 140 |
| CONDITION 25 (EXAMPLE 11) | 0 | 0 | 270 |
| CONDITION 26 (TECHNOLOGY OF THE RELATED ART) | 0 | 0 | NONE |

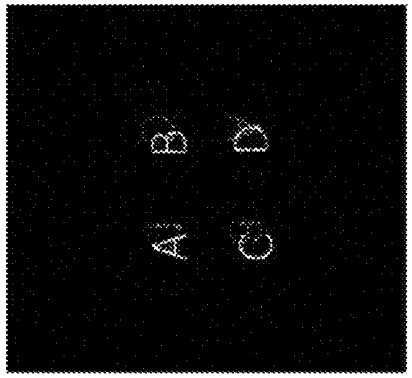
FIG. 13D
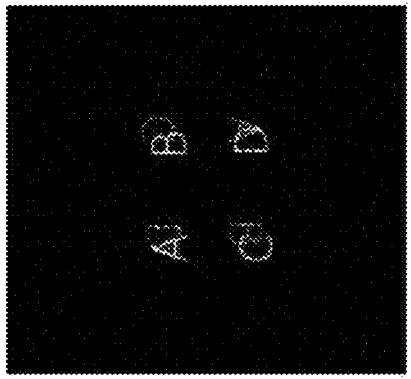
FIG. 13C
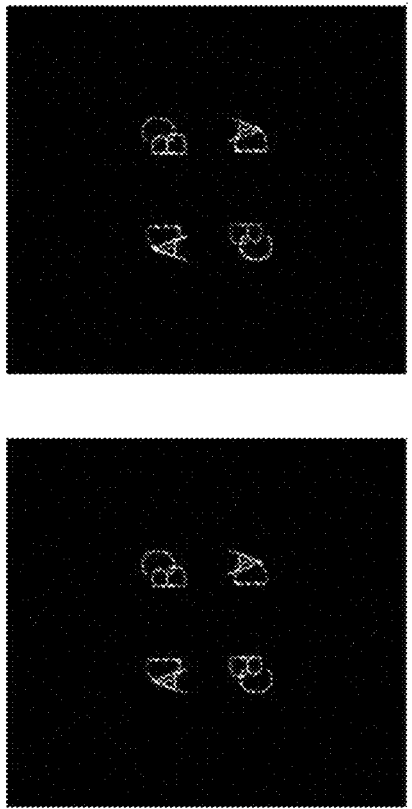
FIG. 13B
FIG. 13A
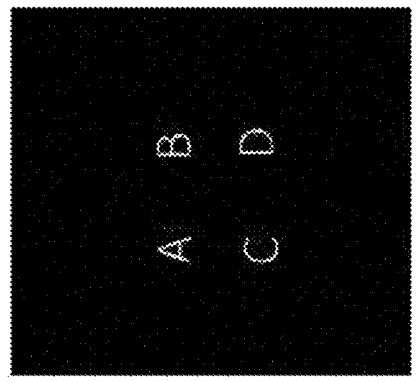
FIG. 13G
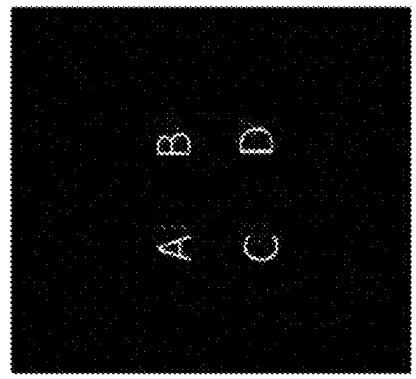
FIG. 13F
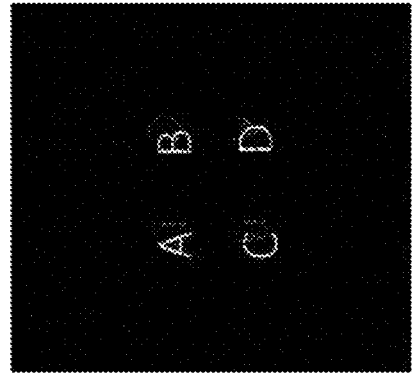
FIG. 13E

IMAGE PROCESSING APPARATUS, IMAGING SYSTEM, IMAGE PROCESSING METHOD, AND RECORDING MEDIUM

CROSS-REFERENCE TO RELATED APPLICATIONS

This application is a Continuation of PCT International Application No. PCT/JP2018/014981 filed on Apr. 10, 2018, which claims priority under 35 U.S.C § 119(a) to Japanese Patent Application No. 2017-109269 filed on Jun. 1, 2017. Each of the above application(s) is hereby expressly incorporated by reference, in its entirety, into the present application.

BACKGROUND OF THE INVENTION

1. Field of the Invention

The present invention relates to an image processing apparatus, an imaging system, an image processing method, and a non-transitory recording medium and particularly, to a technology for acquiring an image of a subject without a lens.

2. Description of the Related Art

A general type of technology for acquiring an image of a subject is a technology for forming an optical image of a subject using a lens. In recent years, a technology for acquiring the image of the subject without a lens has been developed. For example, in "Development of lensless camera technology enabling easy focus adjustment after motion picture imaging", [online], Nov. 15, 2016, Hitachi, Ltd., [searched on May 8, 2017], Internet (http://www.hitachi-.cojpNew/cnews/month/2016/11/1115.html), a Fresnel zone plate is arranged near an imaging element, and the image of the subject can be acquired without a lens by performing Fourier transformation on a moire fringe generated by superimposing a projected image formed on the imaging element by light from the subject with a projected pattern corresponding to the Fresnel zone plate. An effect such as a decrease in size of an apparatus is expected. The technology in "Development of lensless camera technology enabling easy focus adjustment after motion picture imaging", [online], Nov. 15, 2016, Hitachi, Ltd., [searched on May 8, 2017], Internet (http://www.hitachi.cojpNew/cnews/month/2016/11/1115.html) is also disclosed in Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016.

In addition, a lensless imaging technology for using the Fresnel zone plate in the mask pattern like in "Development of lensless camera technology enabling easy focus adjustment after motion picture imaging", [online], Nov. 15, 2016, Hitachi, Ltd., [searched on May 8, 2017], Internet (http://www.hitachi.cojpNew/cnews/month/2016/11/1115.html) and Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016 is known (refer to WO2016/203573A). In WO2016/203573A, an image of a subject is reconstructed by performing Fourier transformation on a moire fringe that is formed by light incident on two grating patterns (Fresnel zone plates) arranged opposite to each other from the subject.

SUMMARY OF THE INVENTION

In reconstruction of the image, in the method of acquiring the projected image by multiplying one Fresnel zone pattern with the Fresnel zone plate used in imaging as in the technology of the related art, two solutions (symmetric about the center) are obtained by Fourier transformation. It is not possible to specify which solution is the true solution, that is, the direction in which the subject is present. Hereinafter, this point will be described. FIGS. 17A to 17E are diagrams illustrating reconstruction of the image in a case where light of a point light source present at infinity is incident on the Fresnel zone plate from an inclined direction. In this case, a projected image illustrated in FIG. 17A is formed. In a case where the projected image is multiplied with a Fresnel zone pattern illustrated in FIG. 17B, a moire fringe in the vertical direction and a noise component having a concentric shape are superimposed in the post-multiplication image as illustrated in FIG. 17C. In a case where one dimension is considered for simplification, for example, a signal intensity in an X direction in the image illustrated in FIG. 17C is illustrated in FIG. 17D. In a case where the signal intensity is subjected to Fourier transformation, two solutions are obtained at positions symmetric about the center as illustrated in FIG. 17E, and it is not possible to specify which solution is the true solution.

FIGS. 18A to 18D are diagrams illustrating a simulation result of the reconstructed image based on the method of acquiring the projected image by multiplying one Fresnel zone pattern with the Fresnel zone plate used in imaging. FIG. 18A illustrates the subject. In a case where the subject is reconstructed as described above, an image illustrated in FIG. 18B is obtained. As illustrated in FIG. 18B, the image obtained by reconstruction is an unclear image in which two subject images overlap. Regarding this problem, in a case where the subject images are prevented from overlapping by hiding (not capturing) the right half of the subject as illustrated in FIG. 18C, the reconstruction result illustrated in FIG. 18D is acquired, and an imaging range is reduced. In WO2016/203573A, overlapping of the images is avoided by cutting the reconstructed image in half and displaying the cut reconstructed image. However, by cutting a part of the reconstructed image, an angle of view (imaging range) is reduced, and the image quality of the reconstructed image may be decreased. Furthermore, in WO2016/203573A, plates (substrates) corresponding to two patterns are maintained. Thus, problems such as an increase in size of the apparatus, an increase in manufacturing cost, and deterioration of image quality caused by variations (including variations at the time of manufacturing, a temporal change, and a change in temperature) of characteristics arise.

In the technology of the related art, in the case of acquiring an image without a lens, an image that has a wide angle of view and is clear is not obtained.

The present invention is conceived in view of such matters. An object of the present invention is to provide an image processing apparatus, an imaging system, an image processing method, and a non-transitory recording medium capable of obtaining a clear image having a wide angle of view without using a lens.

In order to achieve the object, an image processing apparatus according to a first aspect of the present invention comprises a projected image input unit that inputs a projected image formed by light incident on a Fresnel zone plate from a subject, a complex image generation unit that generates a complex image consisting of an image of a real part and an image of an imaginary part by multiplying the projected image with each of a first Fresnel zone pattern and a second Fresnel zone pattern having the same local spatial frequency in each region and a different phase of the local spatial frequency with respect to the first Fresnel zone pattern, and a Fourier transformation unit that reconstructs an image of a spatial domain by performing two-dimensional complex Fourier transformation on the complex image.

In the first aspect, the image of the spatial domain is reconstructed by performing two-dimensional complex Fourier transformation on the complex image consisting of the image of the real part and the image of the imaginary part which are obtained by multiplying the projected image with each of the first Fresnel zone pattern and the second Fresnel zone pattern having different phases of the local spatial frequencies. Accordingly, the position of the subject can be specified from a signal component of a moire fringe by removing a noise component. A clear image not having overlapping of subject images can be obtained without a lens. In addition, since it is not necessary to hide a part of the subject, the image can be obtained at a wide angle of view. Furthermore, the first and second Fresnel zone patterns may be maintained as electronic data. Thus, problems such as an increase in size of the apparatus caused by maintaining plates (substrates) corresponding to two patterns like in WO2016/203573A do not arise.

In the first aspect and each aspect below, the "Fresnel zone plate" includes a zone plate of which the transmittance of the subject light continuously changes depending on a distance from the center, and a zone plate of which the transmittance non-continuously (transmission or non-transmission) changes by setting a threshold value for the transmittance of the subject light incident on the zone plate. In addition, the projected image used in reconstruction of the image may be acquired by an imaging unit including the Fresnel zone plate and an image sensor, or the projected image that is separately recorded may be acquired through a non-transitory recording medium or a network.

The image processing apparatus according to a second aspect is such that in the first aspect, the phases of the local spatial frequencies of the first Fresnel zone pattern and the second Fresnel zone pattern are shifted positively or negatively in a range of greater than or equal to 70° and smaller than or equal to 110°. The second aspect defines the range of the shift in phase in which a clear image can be reconstructed.

The image processing apparatus according to a third aspect is such that in the first or second aspect, the phase of the local spatial frequency of the first Fresnel zone pattern or the phase of the local spatial frequency of the second Fresnel zone pattern is the same as a phase of a local spatial frequency of the Fresnel zone plate.

The image processing apparatus according to a fourth aspect is such that in any one of the first to third aspects, the complex image generation unit generates the image of the real part by multiplying the projected image with the first Fresnel zone pattern and generates the image of the imaginary part by multiplying the projected image with the second Fresnel zone pattern.

The image processing apparatus according to a fifth aspect is such that in any one of the first to fourth aspects, the complex image generation unit generates the complex image by using the first Fresnel zone pattern and the second Fresnel zone pattern that have different enlargement ratios depending on a subject distance in focus. The projected image formed by the Fresnel zone plate has a different size depending on the distance of the subject. Thus, it is preferable that the enlargement ratio of the multiplied Fresnel zone pattern is different depending on the distance of the subject. According to the fifth aspect, by generating the complex image using the first Fresnel zone pattern and the second Fresnel zone pattern having different enlargement ratios depending on the subject distance in focus, a less blurred clear image can be obtained.

The image processing apparatus according to a sixth aspect further comprises, in any one of the first to fifth aspects, an information input unit that inputs information of a local spatial frequency of the Fresnel zone plate, in which the complex image generation unit multiplies the projected image with each of the first Fresnel zone pattern and the second Fresnel zone pattern that have the local spatial frequency based on the input information. As in the sixth aspect, by superimposing the Fresnel zone patterns based on information of the Fresnel zone plate used in imaging, the reconstruction of the image can be quickly and easily performed. The "information of the local spatial frequency" includes information of a pitch of the Fresnel zone plate. For example, the first Fresnel zone pattern and the second Fresnel zone pattern having the same pitch as the input pitch of the Fresnel zone plate can be used.

In order to achieve the object, an imaging system according to a seventh aspect of the present invention comprises an imaging unit that includes a Fresnel zone plate on which light from a subject is incident, and an image sensor in which a projected image is formed by the light transmitted through the Fresnel zone plate, and that acquires the projected image from the image sensor, and the image processing apparatus according to any one of the first to sixth aspects, in which the projected image input unit inputs the projected image acquired by the imaging unit. According to the seventh aspect, by using the projected image acquired by the imaging unit, a clear image can be obtained at a wide angle of view without using a lens in the same manner as the first aspect.

In order to achieve the object, an image processing method according to an eighth aspect of the present invention comprises a step of inputting a projected image formed by light incident on a Fresnel zone plate from a subject, a step of generating a complex image consisting of an image of a real part and an image of an imaginary part by multiplying the projected image with each of a first Fresnel zone pattern and a second Fresnel zone pattern having the same local spatial frequency in each region and a different phase of the local spatial frequency with respect to the first Fresnel zone pattern, and a step of reconstructing an image of a spatial domain by performing two-dimensional complex Fourier transformation on the complex image. According to the eighth aspect, a clear image can be obtained at a wide angle of view without using a lens in the same manner as the first and seventh aspects.

The image processing method according to a ninth aspect is such that in the eighth aspect, the phases of the local spatial frequencies of the first Fresnel zone pattern and the second Fresnel zone pattern are shifted positively or negatively in a range of greater than or equal to 70° and smaller than or equal to 110°. In the same manner as the second aspect, the ninth aspect defines the range of the shift in phase in which a clear image can be reconstructed.

The image processing method according to a tenth aspect is such that in the eighth or ninth aspect, the phase of the local spatial frequency of the first Fresnel zone pattern or the phase of the local spatial frequency of the second Fresnel zone pattern is the same as a phase of a local spatial frequency of the Fresnel zone plate.

The image processing method according to an eleventh aspect is such that in any one of the eighth to tenth aspects, in the step of generating the complex image, the image of the real part is generated by multiplying the projected image with the first Fresnel zone pattern, and the image of the imaginary part is generated by multiplying the projected image with the second Fresnel zone pattern.

The image processing method according to a twelfth aspect is such that in any one of the eighth to eleventh aspects, in the step of generating the complex image, the complex image is generated using the first Fresnel zone pattern and the second Fresnel zone pattern that have different enlargement ratios depending on a subject distance in focus. According to the twelfth aspect, a less blurred clear image can be obtained in the same manner as the fifth aspect.

The image processing method according to a thirteenth aspect further comprises, in any one of the eighth to twelfth aspects, a step of acquiring the projected image from an image sensor by the Fresnel zone plate on which the light from the subject is incident, and the image sensor in which the projected image is formed by the light transmitted through the Fresnel zone plate, in which in the step of inputting the projected image, the acquired projected image is input.

The image processing method according to a fourteenth aspect further comprises, in any one of the eighth to thirteenth aspects, a step of inputting information of a local spatial frequency of the Fresnel zone plate, in which in the step of generating the complex image, the projected image is multiplied with each of the first Fresnel zone pattern and the second Fresnel zone pattern that have the local spatial frequency based on the input information. According to the fourteenth aspect, the reconstruction of the image can be quickly and easily performed in the same manner as the sixth aspect.

In order to achieve the object, a non-transitory recording medium according to a fifteenth aspect of the present invention is a non-transitory recording medium on which a computer-readable code of an image processing program is recorded. The image processing program causes a computer to implement a function of inputting a projected image formed by light incident on a Fresnel zone plate from a subject, a function of generating a complex image consisting of an image of a real part and an image of an imaginary part by multiplying the projected image with each of a first Fresnel zone pattern and a second Fresnel zone pattern having the same local spatial frequency in each region and a different phase of the local spatial frequency with respect to the first Fresnel zone pattern, and a function of reconstructing an image of a spatial domain by performing two-dimensional complex Fourier transformation on the complex image. According to the fifteenth aspect, a clear image can be obtained at a wide angle of view without using a lens in the same manner as the first and eighth aspects. The image processing program recorded on the non-transitory recording medium in the fifteenth aspect may be a program that further causes the computer to implement the same features (functions) as the image processing method according to the ninth to fourteenth aspects.

As described thus far, according to the image processing apparatus, the imaging system, the image processing method, and the non-transitory recording medium of the present invention, a clear image can be obtained at a wide angle of view without using a lens.

BRIEF DESCRIPTION OF THE DRAWINGS

FIGS. 1A to 1I are diagrams illustrating reconstruction of an image in an embodiment of the present invention.

FIGS. 7A and 7B are diagrams illustrating examples of a Fresnel zone plate.

FIGS. 8A and 8B are diagrams illustrating examples of Fresnel zone patterns having different phases.

FIG. 9 is a flowchart illustrating an image processing method according to the first embodiment.

FIG. 10 is a diagram illustrating enlargement or reduction of the Fresnel zone pattern depending on a focal distance.

FIG. 11 is a diagram illustrating conditions of examples.

FIGS. 13A to 13G are diagrams illustrating results of examples and comparative examples.

DESCRIPTION OF THE PREFERRED EMBODIMENTS

Hereinafter, an image processing apparatus, an imaging system, an image processing method, and a recording medium according to an embodiment of the present invention will be described with reference to the appended drawings.

<Summary of Image Processing>

FIGS. 1A to 1I are diagrams for describing a summary of image processing in the embodiment of the present invention. For simplification, a case of imaging a point light source at infinite distance in one dimension and reconstructing an image will be described. FIG. 1A is a projected image formed in an image sensor by light incident on a Fresnel zone plate from a subject. The projected image is shifted depending on the direction of the point light source. An image obtained by multiplying the projected image with a first Fresnel zone pattern (the phase of the local spatial frequency at the center is 0°) illustrated in FIG. 1B is the image illustrated in FIG. 1C. This image will be referred to as an image of a real part. A signal intensity of the image of the real part in an X direction is illustrated in FIG. 1F.

Similarly, an image obtained by multiplying the projected image illustrated in FIG. 1A with a second Fresnel zone pattern (Fresnel zone pattern that has the same local spatial frequency in each region as the first Fresnel zone pattern and has a shift of 90° in phase of the local spatial frequency with the first Fresnel zone pattern) illustrated in FIG. 1D is the image illustrated in FIG. 1E. This image will be referred to as an image of an imaginary part. FIG. 1G is an example of the signal intensity of the image illustrated in FIG. 1E in the X direction. The local spatial frequency of the Fresnel zone pattern corresponds to a pattern having a shape of streaks configured with transmission regions and light blocking regions. The detail of the shape of streaks is referred to as a pitch.

A complex image is configured with the image of the real part illustrated in FIG. 1C and the image of the imaginary part illustrated in FIG. 1E. A graph plotted in a Y direction denoting the signal intensity of the image of the real part illustrated in FIG. 1F and a Z direction denoting the signal intensity of the image of the imaginary part illustrated in FIG. 1G with respect to the X direction is illustrated in FIG. 1H. In a case where the complex image is subjected to two-dimensional complex Fourier transformation, a signal having one peak is obtained as illustrated in FIG. 1I. This signal corresponds to an image of a spatial domain, and the position of the peak corresponds to the position of the point light source which is the subject.

Figure 2A:
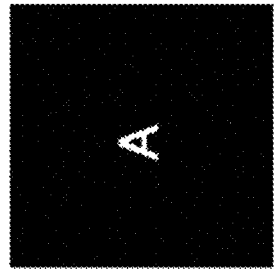
FIGS. 2A to 2H are diagrams illustrating the reconstruction of the image in the embodiment of the present invention.
Figure 2B:
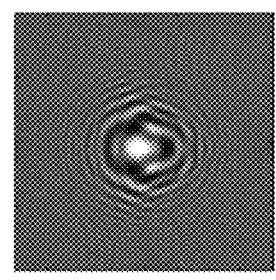
Figure 2C:
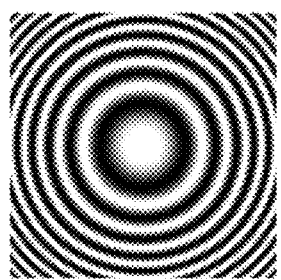
Figure 2D:
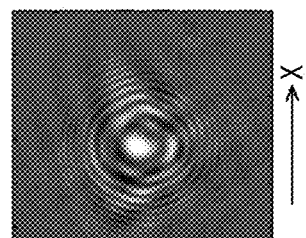
Figure 2E:
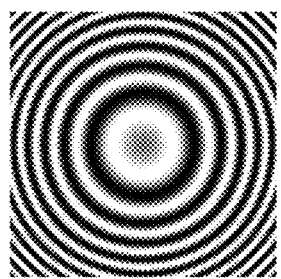
Figure 2F:
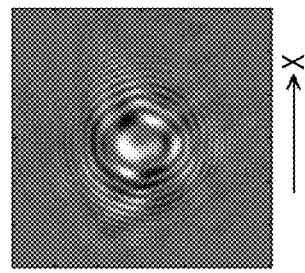
Figure 2G:
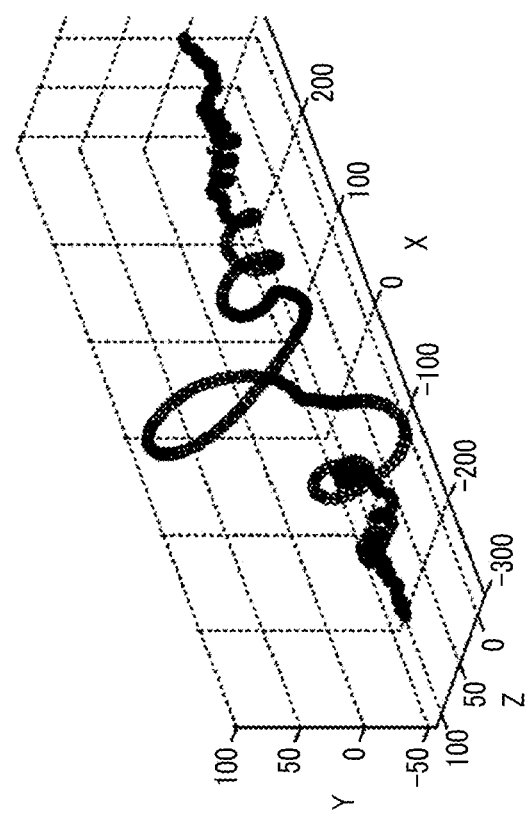
Figure 2H:
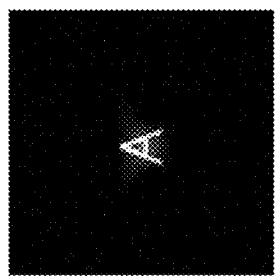

A case of a subject (two dimensions) other than the point light source will be described with respect to the reconstruction of the image similar to FIGS. 1A to 1I. FIG. 2A illustrates a text type subject. FIG. 2B is a projected image formed in the image sensor by light incident on the Fresnel zone plate from the subject. An image obtained by multiplying the projected image with a first Fresnel zone pattern (the phase of the local spatial frequency at the center is 0°) illustrated in FIG. 2C is the image illustrated in FIG. 2D. This image will be referred to as an image of a real part. In addition, an image obtained by multiplying the projected image illustrated in FIG. 2A with a second Fresnel zone pattern (Fresnel zone pattern that has the same local spatial frequency in each region as the first Fresnel zone pattern and has a shift of 90° in phase of the local spatial frequency with the first Fresnel zone pattern) illustrated in FIG. 2E is the image illustrated in FIG. 2F. This image will be referred to as an image of an imaginary part. A graph plotted in the Y direction denoting the signal intensity of the image of the real part illustrated in FIG. 2D and the Z direction denoting the signal intensity of the image of the imaginary part illustrated in FIG. 2F with respect to the X direction is illustrated in FIG. 2G In a case where the complex image is subjected to two-dimensional complex Fourier transformation, the image of the subject is reconstructed as illustrated in FIG. 2H.

As described with reference to FIGS. 1A to 1I and FIGS. 2A to 2H, according to the embodiment of the present invention, a clear image not having overlapping of the subject images can be obtained without a lens unlike a case of a technology of the related art described with FIGS. 17A to 17E and FIGS. 18A to 18D. In addition, the imaging range is not reduced, and the image can be acquired at a wide angle of view.

<Details of Image Processing>

Details of the image processing in the embodiment of the present invention will be described in further detail.

A pattern I(r) of a coded aperture (Fresnel zone plate) is represented by Expression (1).

$$I(r) = \cos \beta r^2 \quad (1)$$

As the value of I(r) is increased, the transmittance of light in a predetermined wavelength range is increased. The radius of the Fresnel zone plate is denoted by r. A constant determining the detail (pitch) of the pattern is denoted by $\beta (>0)$. Hereinafter, in order to avoid a minus value, I2(r) that falls in a range of 0 to 1 by applying an offset as in Expression (2) will be considered.

$$I2(r) = \tfrac{1}{2}(1 + \cos \beta r^2) \quad (2)$$

Figure 3:
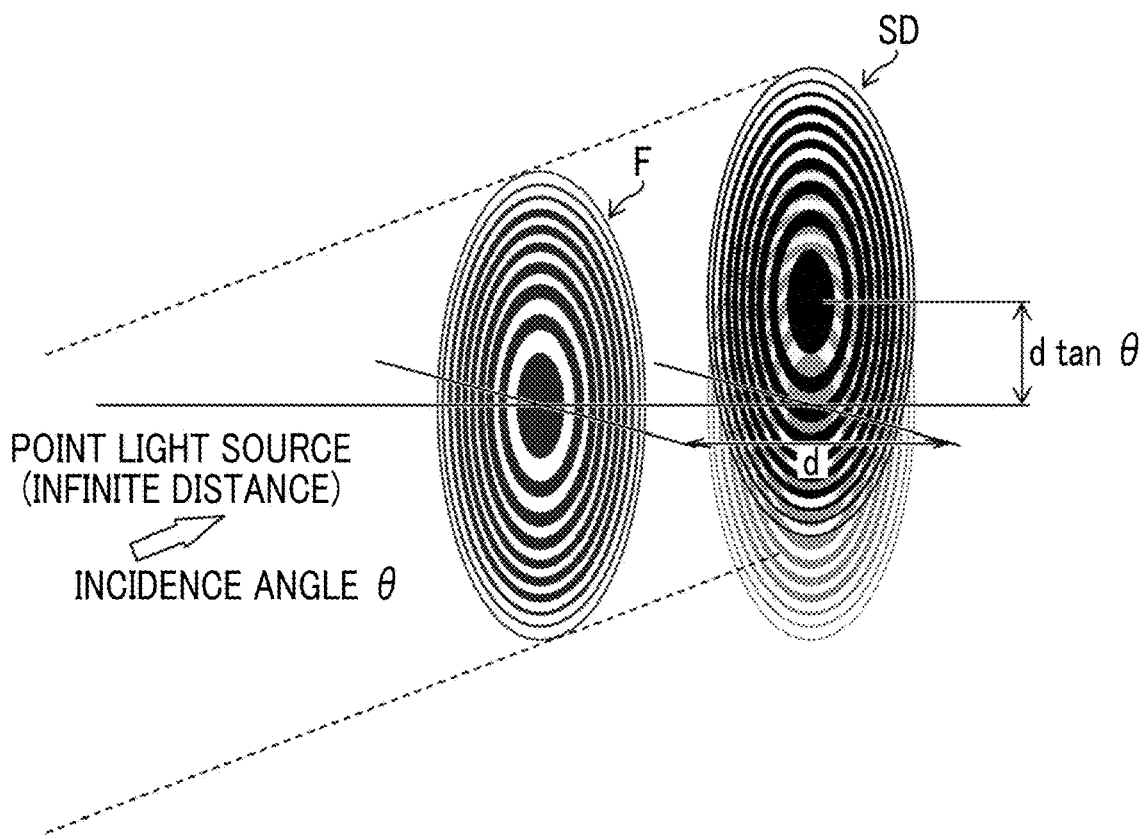
FIG. 3 is a diagram illustrating translation of a projected image caused by incidence of inclined light.

It is assumed that the coded aperture (Fresnel zone plate F) is arranged away from the sensor surface by a distance d (refer to FIG. 3). At this point, in a case where it is assumed that light (parallel light) is incident at an incidence angle θ from a point light source at infinite distance, a shadow SD of the coded aperture (Fresnel zone plate F) is translated by $\Delta r$ (=d×tan θ) and is casted on the sensor (refer to FIG. 3). A translated shadow S(r) is represented by Expression (3).

$$S(r) = I2(r - \Delta r) = \tfrac{1}{2}\{1 + \cos \beta (r - \Delta r)^2\} \quad (3)$$

I2(r) and S(r) are originally two-dimensional images and are functions of two variables. However, for simplification, only one-dimensional images on a cross section acquired by cutting by a plane including the centers of the two-dimensional images and the incidence light source will be focused. The one-dimensional images can be extended to a two-dimensional case in a case where calculation is performed as in Expression (4) below.

$$r = \sqrt{x^2 + y^2} \quad (4)$$

A captured shadow image (projected image) is subjected to image restoration (reconstruction) in a computer and is output. In an image restoration process, the shadow image is multiplied with a Fresnel zone aperture image (Fresnel zone pattern) that is not positionally shifted. For this function of interior multiplication, a case of two functions represented by Expressions (5) and (6) below will be considered. The imaginary unit is denoted by j.

$$Mr(r) = I(r) = \cos \beta r^2 \quad (5)$$

$$Mc(r) = e^{j\beta r^2} \quad (6)$$

Mr(r) is the same real number function as I(r). However, the offset (direct current component) is removed in Mr(r). Reconstruction of the image in the technology of the related art ("Development of lensless camera technology enabling easy focus adjustment after motion picture imaging", [online], Nov. 15, 2016, Hitachi, Ltd., [searched on May 8, 2017], Internet (http://www.hitachi.co.jpNew/cnews/month/2016/11/1115.html), Yusuke Nakamura, Takeshi Shimano, Kazuyuki Tajima, Mayu Sao, and Taku Hoshizawa (Hitachi, Ltd.) "Lensless Light-field Imaging with Fresnel Zone Aperture", The Institute of Image Information and Television Engineers Technical Report, vol. 40, no. 40, IST2016-51, pp. 7-8, November, 2016, and WO2016/203573A) corresponds to a case of multiplying the projected image of the real number aperture by the Fresnel zone pattern represented by the real number function Mr(r). Mc(r) is a complex number function, and Mc(r)=cos βr2+j×sin βr2=cos βr2−j×cos (βr2+π/2) is established. Thus, the real part and the imaginary part correspond to Fresnel zone patterns of which the phases are shifted by (π/2), that is, 90°. Mc(r) has the same real number part (cos βr2) as Mr(r). In the embodiment of the present invention, the complex image including the image of the real part and the image of the imaginary part is generated by multiplying the projected image with two Fresnel zone patterns (first and second Fresnel zone patterns) of different phases corresponding to the real part and the imaginary part of the complex number function, respectively.

The image after interior multiplication in each case is represented by Expressions (7) and (8).

$$Fr(r) = \qquad (7)$$
$$S(r)Mr(r) = 1(r-\Delta r)\cos\beta r^2 = \frac{1}{2}\cos\beta r^2 + \frac{1}{2}\cos\beta(r-\Delta r)^2\cos\beta r^2 =$$
$$\frac{1}{2}\cos\beta r^2 + \frac{1}{4}\cos\beta(-2r\Delta r + \Delta r^2) + \frac{1}{4}\cos\beta(2r^2 - 2r\Delta r + \Delta r^2)$$

$$Fc(r) = S(r)Mc(r) = \qquad (8)$$
$$1(r-\Delta r)e^{j\beta r^2} = \frac{1}{2}e^{j\beta r^2} + \frac{1}{4}\left(e^{j\beta(r-\Delta r)^2} + e^{-j\beta(r-\Delta r)^2}\right)e^{j\beta r^2} =$$
$$\frac{1}{2}e^{j\beta r^2} + \frac{1}{4}e^{j\beta(2r\Delta r - \Delta r^2)} + \frac{1}{4}e^{j\beta(2r^2 - 2r\Delta r + \Delta r^2)}$$

In each of post-multiplication images Fr(r) and Fc(r) corresponding to a case of using Mr(r) and Mc(r) in the interior multiplication image (Fresnel zone pattern), the first term is a component that can be removed by offset correction and the like. The second term is a moire interference fringe from which a "frequency of difference" (corresponds to cos (α−φ) in a case where two apertures are represented by cos α and cos φ) between superimposed Fresnel zone apertures is extracted and matches the basis of Fourier transformation. Thus, the second term is a component that is transformed into a delta function and changed into a "point" by applying Fourier transformation and contributes to image formation. The third term corresponds to a "frequency of sum" (corresponds to cos (α+φ)). The third term is a component that does not contribute to image formation and acts as a noise even in a case where Fourier transformation is performed.

The images in a state where the first term is removed by applying appropriate offset correction to Fr(r) and Fc(r) are denoted by Fr2(r) and Fc2(r). In a case where Fourier transformation is actually applied to Fr2(r) and Fc2(r), Fourier transformation of Fr(r) and Fc(r) is denoted by fr(k) and fc(k) and is represented by Expressions (9) and (10).

$$fr(k) = \mathcal{F}[Fr2(r)] = \frac{1}{4}e^{j\beta\Delta r^2}\delta(k-2\beta\Delta r) + \qquad (9)$$
$$\frac{1}{4}e^{-j\beta\Delta r^2}\delta(k+2\beta\Delta r) + \frac{1}{8\sqrt{\beta}}e^{-j\pi/4}\cos\xi(k,\beta,\Delta r)$$

$$fc(k) = \mathcal{F}[Fc2(r)] = \frac{1}{4}e^{-j\beta\Delta r^2}\delta(k-2\beta\Delta r) + \frac{1}{8\sqrt{\beta}}e^{-j\{\frac{\pi}{4}-\xi(k,\beta,\Delta r)\}} \qquad (10)$$

Here, $\xi(k, \beta, \Delta r)$ is a real number polynomial. A restored image can be obtained using the absolute value of a complex number with respect to fr(k). However, in the case of fr(k) (in the case of the technology of the related art), the first term and the second term generate two points that are symmetric about an origin. Thus, a defect is present in that the restored image has point symmetry (refer to the examples in FIGS. 17A to 17E and FIGS. 18A to 18D). In the case of fc(k) (in the case of the embodiment of the present invention), an image is normally reconstructed without posing such a problem. A common point in both cases is that the third term of fr(r) and the second term of fc(r) act as a noise. Due to the effect of these terms, a modulation transfer function (MTF) of an optical system cannot be 100% (meaning that the MTF cannot be 100% even in a case where a noise caused by the sensor is not present). However, this noise is decreased in a case where the value of β is increased. Thus, the effect can be reduced by increasing the value of β (making the pattern more detailed).

A phase rotates by depending on the incidence angle of light. However, in a case where the absolute value of the complex number is used with respect to the first term of fc(k) (in the case of the embodiment of the present invention), it can be confirmed that an image is formed as a delta function (point) in correspondence with arrival of light from infinity. Since the whole calculation of an angular spectrum of the incidence ray to the formed image is linear, superimposition is established. Accordingly, the formation of the image can be described.

In a case where calculation is performed for the two-dimensional case, relative illumination is (cos θ)4, and distortion is 2×β×d×tan θ (θ is an angle of view).

First Embodiment

<Configuration of Imaging System>

Figure 4:
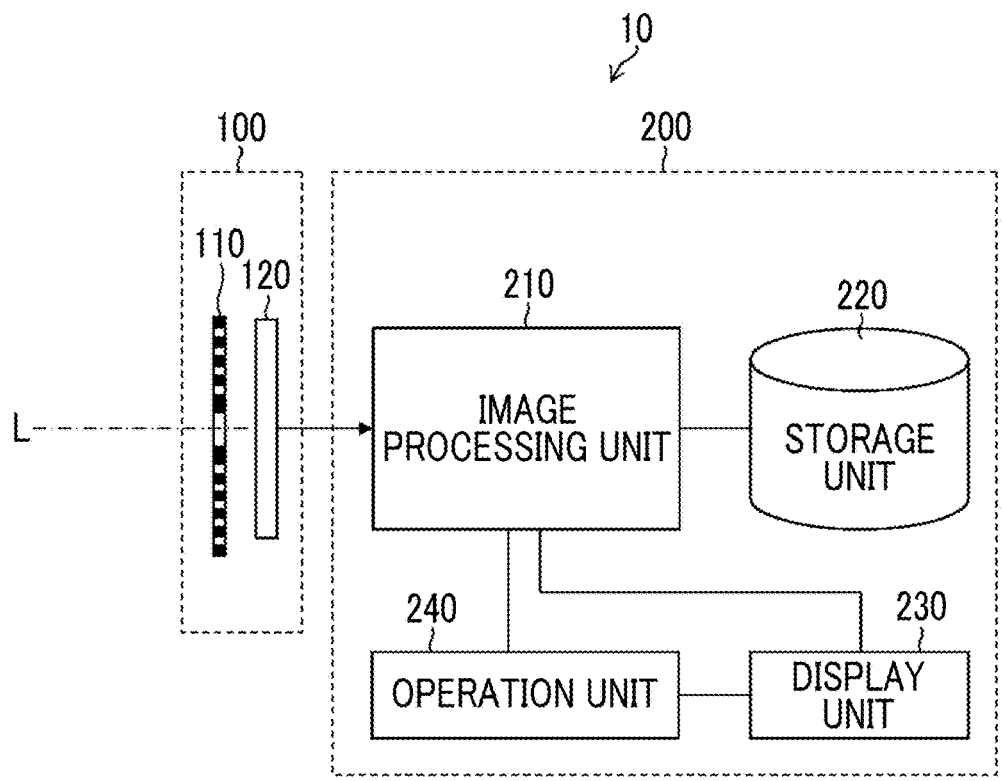
FIG. 4 is a block diagram illustrating a configuration of an imaging system in a first embodiment.

FIG. 4 is a block diagram illustrating a configuration of an imaging system 10 (imaging system) according to a first embodiment. The imaging system 10 comprises an imaging module 100 (imaging unit) and an imaging apparatus main body 200 (image processing apparatus). The imaging system 10 can be applied to a digital camera, a smartphone, a tablet terminal, a monitoring camera, and the like.

<Configuration of Imaging Module>

The imaging module 100 comprises a Fresnel zone plate 110 (Fresnel zone plate) and an imaging element 120 (image sensor). A projected image formed by light transmitted through the Fresnel zone plate 110 from the subject is acquired by the imaging element 120. The Fresnel zone plate 110 is arranged on a light-receiving surface side of the imaging element 120 in a state where the center of the Fresnel zone plate 110 matches the center of the imaging element 120, and the Fresnel zone plate 110 is parallel to the light-receiving surface of the imaging element 120. The imaging module 100 may be replaceable with respect to the imaging apparatus main body 200. In addition, the Fresnel zone plate 110 may be replaceable with respect to the imaging module 100. By separating the use of Fresnel zone plates having different characteristics (a size, a pitch, a phase, a distance to the image sensor, and the like), the characteristics (an angle of view, a depth (distance measurement accuracy), and the like) of the acquired projected image can be controlled, and an image having desired characteristics can be reconstructed. In the following description, the Fresnel zone plate 110 may be referred to as "FZP".

<Configuration of Fresnel Zone Plate>

FIG. 7A is a diagram illustrating FZP1 that is an example of the Fresnel zone plate 110. In FZP 1, the transmittance of incident light continuously changes depending on a distance from the center. A region (transmission region) that is more similar to white has a higher transmittance of light. A region (light blocking region) that is more similar to black has a lower transmittance of light. The transmission region and the light blocking region are alternately arranged in the concentric shape as a whole. The transmission regions and the light blocking regions constitute the Fresnel zone plate. The interval between concentric circles is decreased from the center to the periphery of FZP1. Such a pattern (change in local spatial frequency) of the shape of concentric circles is represented by Expressions (1), (2), and (6) and the like. The detail of the concentric circles in Expressions (1), (2), and (6) is referred to as a "pitch". The pitch is determined by the value of β. In a case where β is small, the pattern is coarse. In a case where β is large, the pattern is detailed. A memory may be disposed in the imaging module 100, and information of the pitch (value of β) may be stored in the memory. An image processing unit 210 (information input unit: refer to FIG. 5) may acquire and use the information.

An optical axis L (refer to FIGS. 1A to 1I) of the Fresnel zone plate 110 is an axis that passes through the centers of FZP and the imaging element 120 and is perpendicular to FZP and the light-receiving surface of the imaging element 120. FZP is arranged near (for example, at approximately 1 mm) the imaging element 120. The projected image may be blurred due to diffraction of light depending on the distance between FZP and the imaging element 120. Thus, it is preferable that FZP is not excessively separated from the imaging element 120.

FIG. 7B is a diagram illustrating FZP2 that is another example of the Fresnel zone plate. In FZP2, a threshold value is set for the transmittance of FZP1. A region in which the transmittance exceeds the threshold value is the transmission region (white part) having a transmittance of 100%. A region in which the transmittance is smaller than or equal to the threshold value is the light blocking region (black part) having a transmittance of 0%. The transmittance non-continuously (in two levels of 0% and 100%) changes depending on the distance from the center. The transmission region and the light blocking region are alternately arranged in the concentric shape as a whole. The transmission regions and the light blocking regions constitute the Fresnel zone plate. The "Fresnel zone plate" in the embodiment of the present invention has the aspect of FZP1 and the aspect of FZP2. Accordingly, the "Fresnel zone pattern" in the embodiment of the present invention also has a pattern in which the transmittance continuously changes and a pattern in which the transmittance non-continuously changes. A light blocking unit (a region in which light is not transmitted like the light blocking region) may be disposed in the peripheral part of the Fresnel zone plate illustrated in FIGS. 7A and 7B, and incidence of unnecessary light on the peripheral part of the imaging element 120 may be prevented.

<Configuration of Imaging Element>

The imaging element 120 is an image sensors that includes a plurality of pixels configured with photoelectric conversion elements arranged in two-dimensional directions (in a two-dimensional shape). Light condensing efficiency may be increased by disposing a microlens in each pixel. In addition, a color image may be reconstructed by arranging a color filter (for example, red, blue, and green) in each pixel. In this case, an interpolation process corresponding to the arrangement pattern of the color filters is performed in the acquisition of the first and second projected image like a demosaicing process (referred to as demosaicing) in color image generation in a typical digital camera. Accordingly, a signal of a color insufficient in each pixel (light-receiving element) is generated, and a signal of each color (for example, red, blue, and green) is obtained in all pixels. For example, such a process can be performed by the image processing unit 210 (projected image input unit 210A).

<Configuration of Imaging Apparatus Main Body>

The imaging apparatus main body 200 comprises the image processing unit 210, a storage unit 220, a display unit 230, and an operation unit 240. The imaging apparatus main body 200 performs image restoration and the like of the subject based on the projected image acquired by the imaging module 100.

Figure 5:
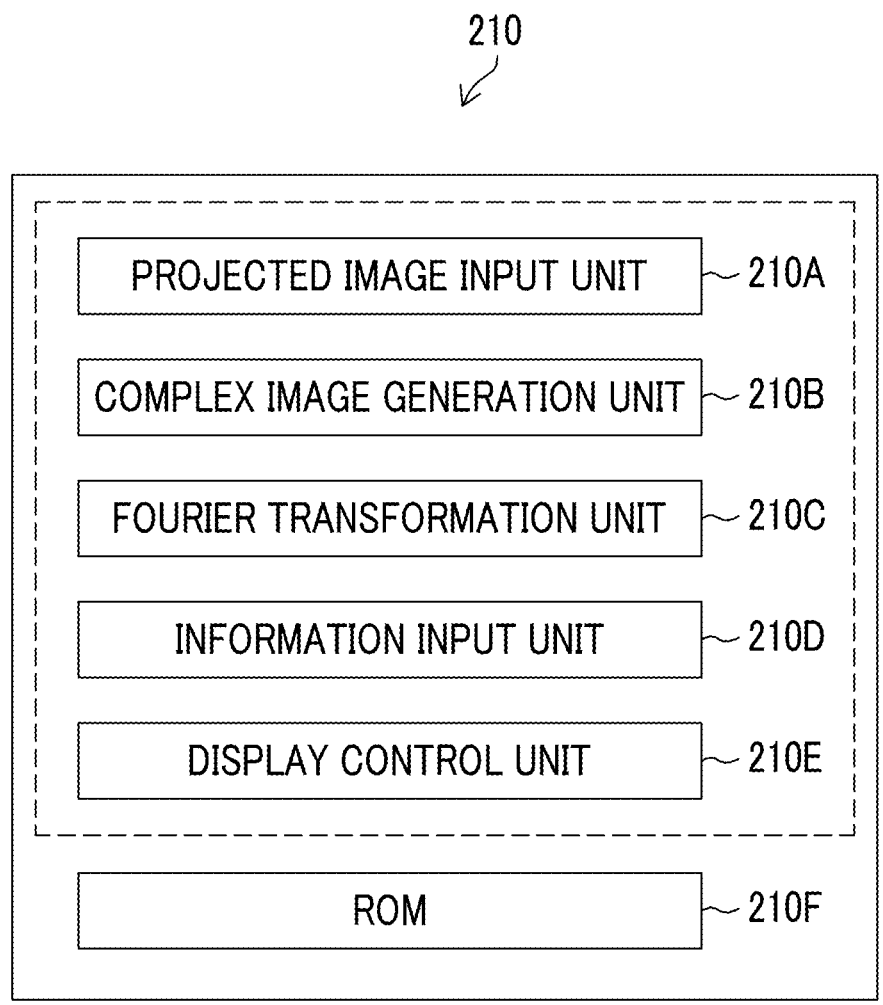
FIG. 5 is a diagram illustrating a configuration of an image processing unit.

FIG. 5 is a diagram illustrating a configuration of the image processing unit 210. The image processing unit 210 includes a projected image input unit 210A (projected image input unit), a complex image generation unit 210B (complex image generation unit), a Fourier transformation unit 210C (Fourier transformation unit), the information input unit 210D (information input unit), and a display control unit 210E. The projected image input unit 210A acquires, from the imaging element 120, the projected image formed in the imaging element 120 by light incident on FZP from the subject by controlling the imaging module 100. The complex image generation unit 210B generates the complex image including the image of the real part and the image of the imaginary part by multiplying the projected image with a plurality of Fresnel zone patterns (first and second Fresnel zone patterns) that have the same local spatial frequencies and have different phases of the local spatial frequencies. The Fourier transformation unit 210C reconstructs the image of the spatial domain by performing two-dimensional complex Fourier transformation on the complex image. The information input unit 210D acquires information (information of the pitch) of the Fresnel zone plate 110 used in the acquisition of the projected image. The display control unit 210E controls display of the projected image, the complex image, the reconstructed image, and the like on the display unit 230. Computer (processor)-readable codes of various programs for operating the imaging system 10 like an image processing program for executing the image processing method according to the embodiment of the present invention are recorded in a read only memory (ROM) 210F (non-transitory recording medium).

The function of the image processing unit 210 can be implemented using various processors. For example, the various processors include a central processing unit (CPU) that is a general-purpose processor implementing various functions by executing software (program). In addition, the various processors include a programmable logic device (PLD) that is a processor such as a field programmable gate array (FPGA) of which the circuit configuration can be changed after manufacturing. Furthermore, the various processors include a dedicated electric circuit or the like that is a processor such as an application specific integrated circuit (ASIC) having a circuit configuration dedicatedly designed to execute a specific process.

The function of each unit may be implemented by one processor or may be implemented by combining a plurality of processors. In addition, a plurality of functions may be implemented by one processor. As an example of implementing a plurality of functions with one processor, a first form is configuring one processor with a combination of one or more CPUs and software and implementing a plurality of functions by the processor as represented by a computer such as a client and a server. A second form is using a processor that implements the function of the whole system by one integrated circuit (IC) chip as represented by a system on chip (SoC) and the like. Various functions are configured using one or more of the various processors as a hardware structure.

Furthermore, the hardware structure of the various processors is more specifically an electric circuit (circuitry) in which circuit elements such as semiconductor elements are combined.

In execution of software (program) by the processor (or the electric circuit), a computer-readable code of the software (including the image processing program according to the embodiment of the present invention) to be executed is stored in a non-transitory recording medium such as the ROM 210F (refer to FIG. 5), and the processor refers to the software. In a process using the software, for example, a random access memory (RAM) is used as a temporary storage region. In addition, for example, data stored in an electronically erasable and programmable read only memory (EEPROM) is referred to. In FIG. 5, illustrations of devices such as the RAM and the EEPROM are omitted.

<Configuration of Storage Unit>

Figure 6:
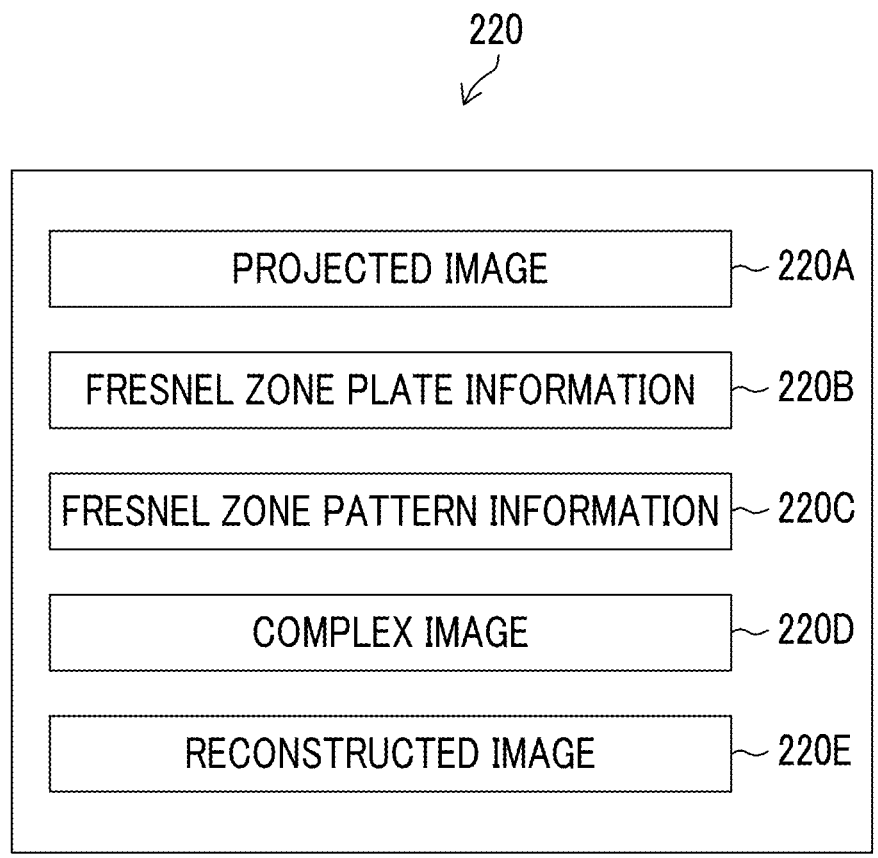
FIG. 6 is a diagram illustrating images and information stored in a storage unit.

The storage unit 220 is configured with a non-transitory recording medium such as a compact disk (CD), a digital versatile disk (DVD), a hard disk, and various semiconductor memories. The storage unit 220 stores images and information illustrated in FIG. 6 in association with each other. A projected image 220A is the projected image acquired from the imaging module 100. Fresnel zone plate information 220B is information (including pitch information such as the value of $\beta$) of the local spatial frequency of the Fresnel zone plate 110. The Fresnel zone plate information 220B may be information acquired from the imaging module 100 or may be information input through the operation unit 240. Fresnel zone pattern information 220C is information indicating the Fresnel zone pattern. It is preferable to record the Fresnel zone pattern information 220C for a plurality of Fresnel zone patterns having different phases of local spatial frequencies. A complex image 220D is a complex image that includes the image of the real part and the image of the imaginary part and is obtained by multiplying the Fresnel zone patterns (first and second Fresnel zone patterns) indicated by the Fresnel zone pattern information 220C with the projected image. A reconstructed image 220E is an image of the spatial domain obtained by performing two-dimensional complex Fourier transformation on the complex image 220D.

<Configurations of Display Unit and Operation Unit>

The display unit 230 is configured to include a display apparatus such as a liquid crystal display, not illustrated. The display unit 230 displays the projected image, the complex image, the reconstructed image, and the like and is also used for displaying a user interface (UI) screen at the time of an instruction input through the operation unit 240. The operation unit 240 is configured with devices such as a keyboard, a mouse, and a button, not illustrated. Using these devices, a user can input a projected image acquisition instruction, an image reconstruction instruction, a focal distance condition, information (the pitch and the phase) of the local spatial frequency, and the like. The display apparatus of the display unit 230 may be configured with a touch panel and may be used as the operation unit 240 in addition to the image display.

<Image Processing by Imaging System>

Image processing by the imaging system 10 having the above configuration will be described. FIG. 9 is a flowchart illustrating a procedure of the image processing method according to the present embodiment.

<Input of Projected Image>

In step S100, the image processing unit 210 (projected image input unit 210A) acquires the projected image of the subject from the imaging element 120 by controlling the imaging module 100. The acquired projected image is the projected image formed in the imaging element 120 by light incident on the Fresnel zone plate 110 from the subject.

<Information of Local Spatial Frequency>

In step S110, the image processing unit 210 (information input unit 210D) inputs information (pitch of the Fresnel zone plate 110) of the local spatial frequency of the Fresnel zone plate 110 used in the acquisition of the projected image. This information may be input from a memory, not illustrated, of the imaging module 100 or may be input in response to an operation performed on the operation unit 240 by the user. In addition, the projected image acquired in step S100 may be analyzed and input by the information input unit 210D. The pitch is determined by the value of $\beta$ in Expressions (1) to (3) and (6) and the like. Thus, the value of $\beta$ may be specifically input. In the case of imaging a known subject (for example, the point light source at infinite distance), the pitch (value of $\beta$) can be acquired by analyzing the captured image. In addition, a value with which a clear image is obtained may be obtained by repeating the reconstruction of the image by changing the pitch (value of $\beta$).

<Generation of Complex Image>

In step S120, the image processing unit 210 (complex image generation unit 210B) generates the complex image including the image of the real part and the image of the imaginary part by multiplying the projected image with each of the first and second Fresnel zone patterns. As the Fresnel zone patterns multiplied in step S120, patterns that are selected from patterns (Fresnel zone pattern information 220C) stored in the storage unit 220 depending on the pitch (value of $\beta$) input in step S110 can be used. In addition, patterns acquired by changing (may be enlargement or reduction as necessary) the patterns stored in the storage unit 220 depending on the pitch (value of $\beta$) can be used. The image processing unit 210 (complex image generation unit 210B) stores the generated complex image in the storage unit 220 as the complex image 220D.

<Phase of Fresnel Zone Pattern>

For example, the first Fresnel zone pattern can be the pattern (phase at the center is 0°; "°" denotes "degree" which is the unit of angles) illustrated in FIG. 8A. The image of the real part is obtained by multiplying the first Fresnel zone pattern with the projected image. In addition, for example, the second Fresnel zone pattern can be the pattern (has the same pitch and a shift of 90° in phase with the first Fresnel zone pattern) illustrated in FIG. 8B. The image of the imaginary part is obtained by multiplying the second Fresnel zone pattern with the projected image. As described with Expression (6) and the like, it is preferable that the shift in phase between the first and second Fresnel zone patterns is 90°. However, as will be perceived from examples described below, in a case where the shift in phase is in a positive or negative range of greater than or equal to 70° and smaller than or equal to 110°, a clear image can be reconstructed. The phase of the local spatial frequency of the first Fresnel zone pattern or the second Fresnel zone pattern may be the same as the phase of the Fresnel zone plate 110.

In using the Fresnel zone pattern, data of a plurality of Fresnel zone patterns having different phases may be stored in the storage unit 220 as the Fresnel zone pattern information 220C, and a desired pattern can be selected and used. The image processing unit 210 (complex image generation unit 210B) may generate a desired pattern based on information of the pitch and the phase (refer to FIG. 12 for the Fresnel zone pattern of each phase). Since the Fresnel zone patterns are stored in the storage unit 220 as the Fresnel zone pattern information 220C that is electronic data, selection and generation of a desired pattern can be quickly and easily performed. In addition, unlike WO2016/203573A, problems such as an increase in size of the apparatus and an increase in manufacturing cost caused by maintaining plates (substrates) corresponding to a plurality of patterns as tangible objects and deterioration of image quality caused by variations (including variations at the time of manufacturing, a temporal change, and a change in temperature) of characteristics between the plurality of patterns do not arise.

<Enlargement Ratio of Fresnel Zone Pattern>

In a case where the subject (light source) is present at infinity, parallel light is incident on the Fresnel zone plate 110, and the projected image formed in the imaging element 120 has the same size as the Fresnel zone plate 110. However, in a case where the subject is present at a finite distance, light that spreads is incident, and the projected image is increased as the distance is decreased. Accordingly, an image that is in focus at a desired distance can be obtained using patterns having different enlargement ratios as the first and second Fresnel zone patterns depending on a subject distance in focus. For example, a plurality of patterns corresponding to the subject distance can be stored in the storage unit 220 as the Fresnel zone pattern information 220C and can be used by reading the patterns. In addition, one Fresnel zone pattern may be stored as a reference pattern and may be enlarged at different enlargement ratios depending on the subject distance. In this case, a pattern that corresponds to the infinite distance and has the same size as the Fresnel zone plate can be used as a reference. FIG. 10 is a diagram illustrating different enlargement ratios of the Fresnel zone pattern depending on the subject distance.

The generation of the complex image (step S120) and the reconstruction of the image (step S130) may be repeated by changing the enlargement ratio, and a clear image may be acquired by maximizing an in-focus evaluation value (for example, the integral value of a brightness signal in a focus evaluation region set in the image) of the reconstructed image.

<Reconstruction of Image>

In step S130, the image processing unit 210 (Fourier transformation unit 210C) reconstructs the image of the subject (image of the spatial domain) by performing two-dimensional complex Fourier transformation on the complex image as illustrated in Expression (10). The image processing unit 210 (display control unit 210E) displays the reconstructed image on the display unit 230 (step S140). In addition, the image processing unit 210 (Fourier transformation unit 210C) stores the reconstructed image in the storage unit 220 as the reconstructed image 220E.

Examples and Comparative Examples

A preferable range of the shift in phase between the first and second Fresnel zone patterns will be specifically described with reference to examples and comparative examples. FIG. 11 is a table illustrating the phase of the Fresnel zone plate for acquisition of the projected image and the phase of the Fresnel zone pattern for acquisition of the complex image (a column with "real part" corresponds to the phase of the first Fresnel zone pattern, and a column with "imaginary part" corresponds to the phase of the second Fresnel zone pattern). Condition 8 (Example 1) to Condition 14 (Example 7) and Condition 22 (Example 8) to Condition 25 (Example 11) illustrate a preferable numerical value range of the shift in phase between the first and second Fresnel zone pattern in the embodiment of the present invention.

Figure 12:
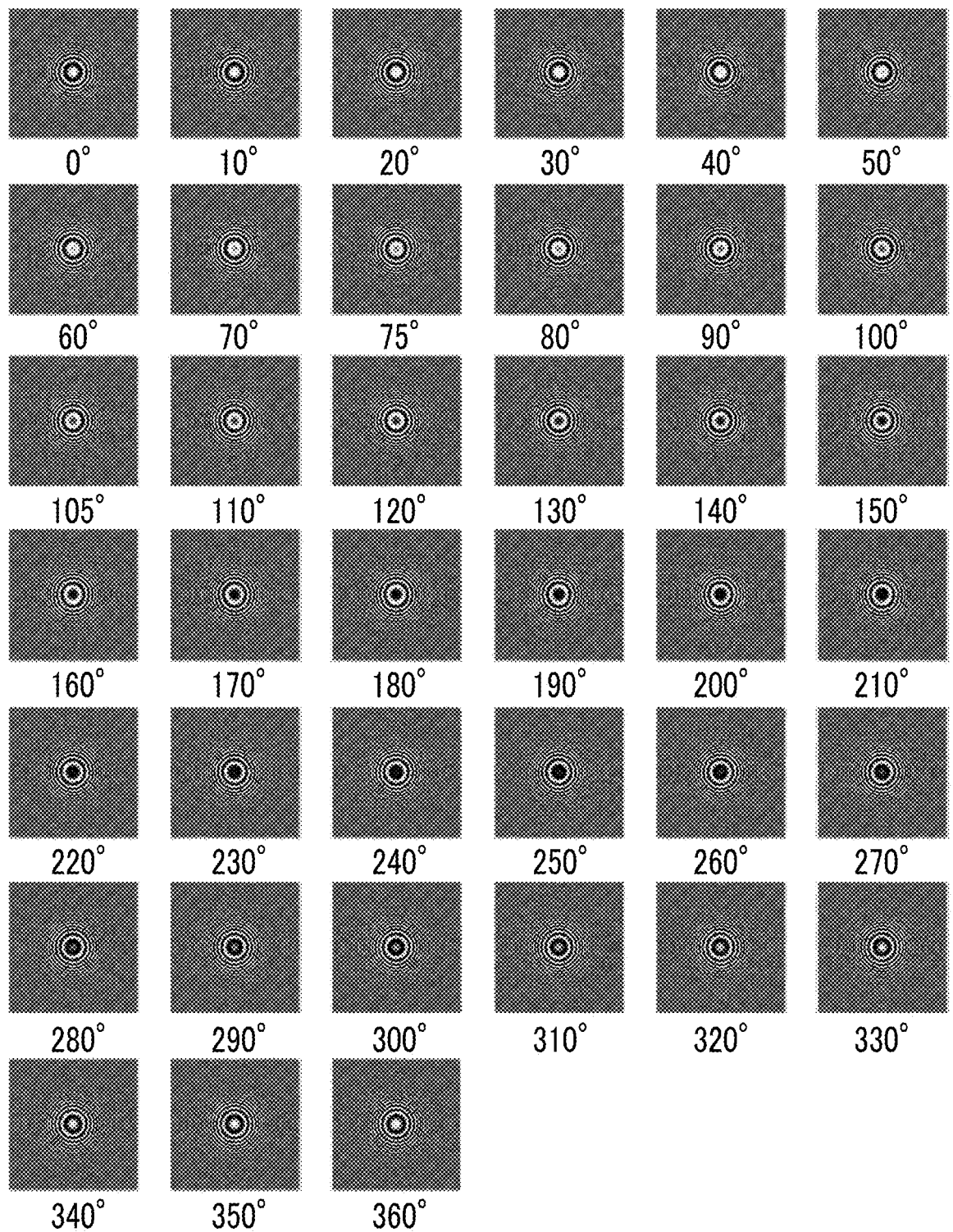
FIG. 12 is a diagram illustrating examples of Fresnel zone patterns having different phases.
Figure 14D:
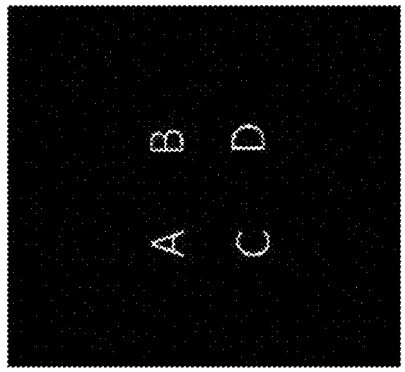
FIGS. 14A to 14G are other diagrams illustrating the results of the examples and the comparative examples.
Figure 14C:
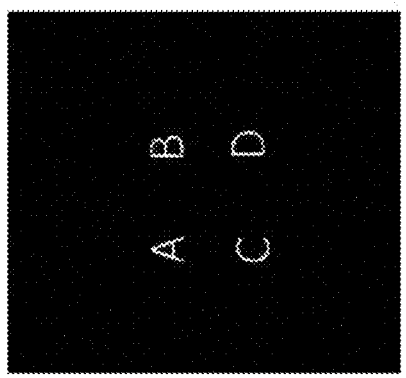
Figure 14G:
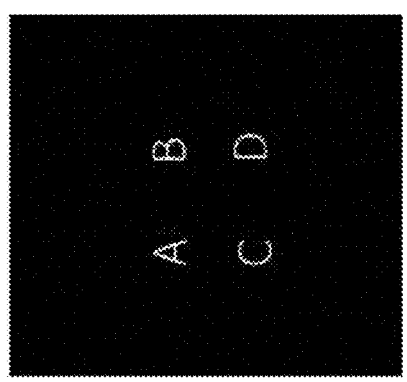
Figure 14B:
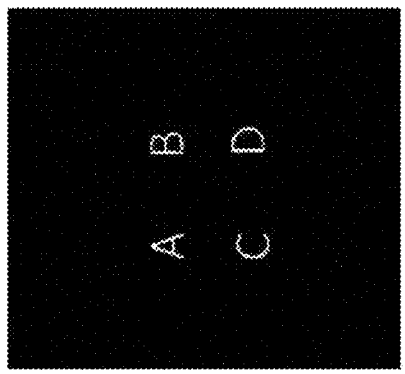
Figure 14F:
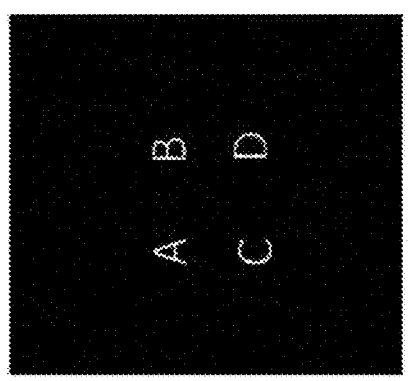
Figure 14A:
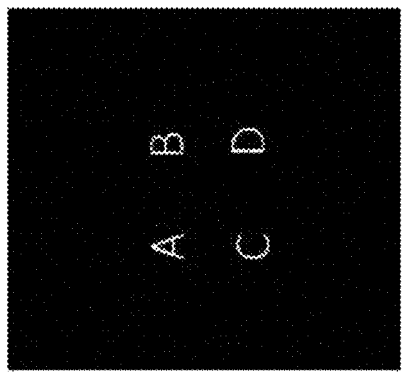
Figure 14E:
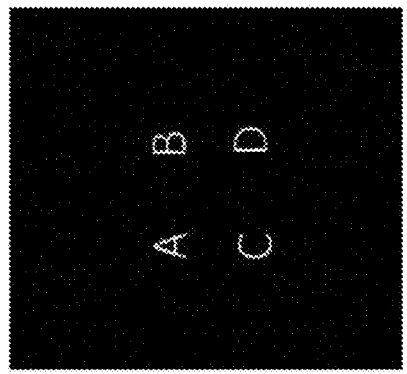
Figure 15D:
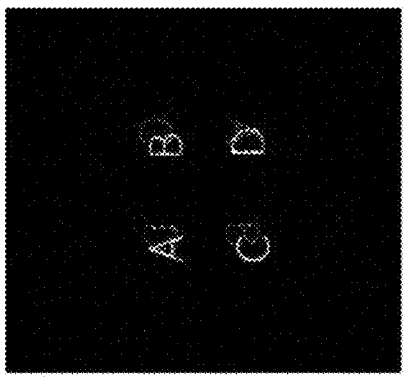
FIGS. 15A to 15G are still other diagrams illustrating the results of the examples and the comparative examples.
Figure 15C:
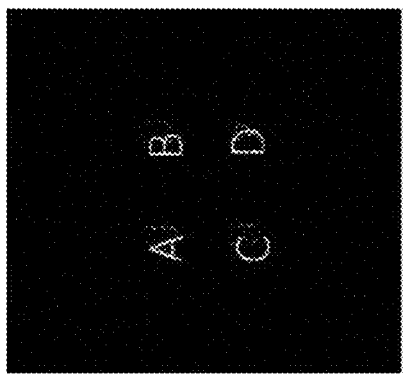
Figure 15B:
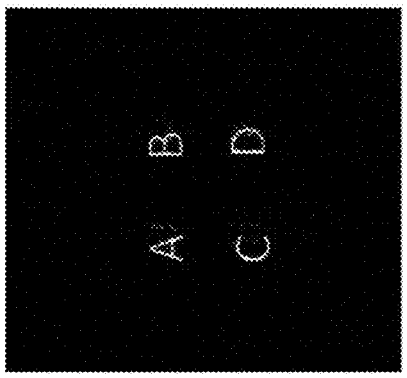
Figure 15A:
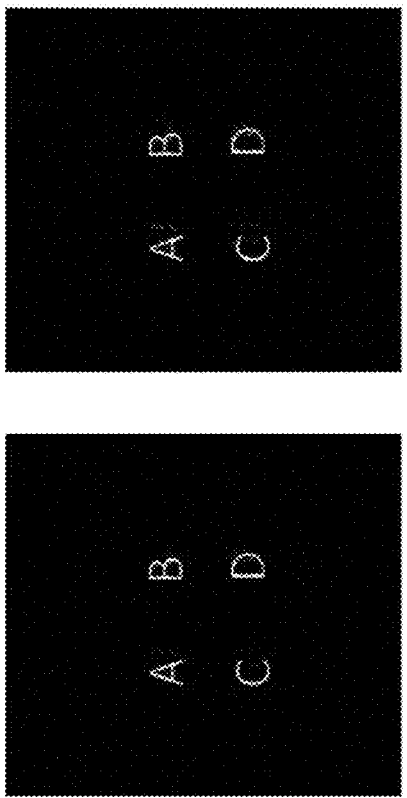
Figure 15G:
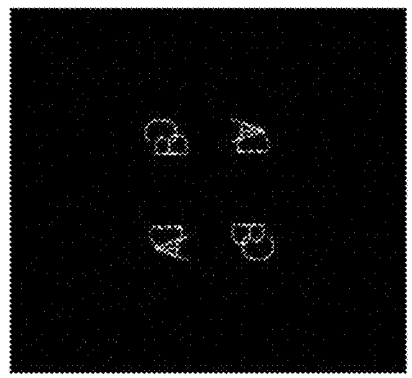
Figure 15F:
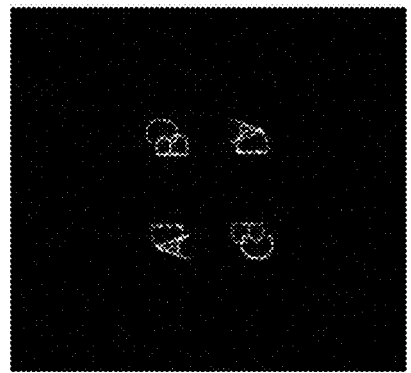
Figure 15E:
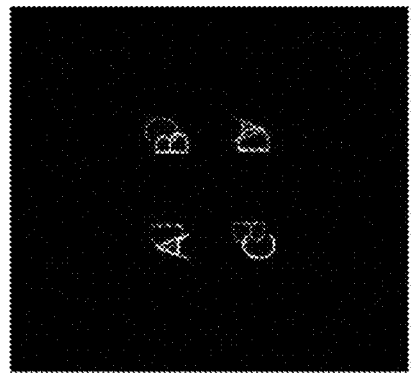

FIG. 12 is a diagram illustrating Fresnel zone patterns having different phases. In FIG. 12, in order from left, the first row illustrates Fresnel zone patterns having phases of 0°, 10°, 20°, 30°, 40°, and 50° at the center. The second row illustrates Fresnel zone patterns having phases of 60°, 70°, 75°, 80°, 90°, and 100° at the center. The third row illustrates Fresnel zone patterns having phases of 105°, 110°, 120°, 130°, 140°, and 150° at the center. The fourth row illustrates Fresnel zone patterns having phases of 160°, 170°, 180°, 190°, 200°, and 210° at the center. The fifth row illustrates Fresnel zone patterns having phases of 220°, 230°, 240°, 250°, 260°, and 270° at the center. The sixth row illustrates Fresnel zone patterns having phases of 280°, 290°, 300°, 310°, 320°, and 330° at the center. The seventh row illustrates Fresnel zone patterns having phases of 340°, 350°, and 360° at the center.

Figure 16E:
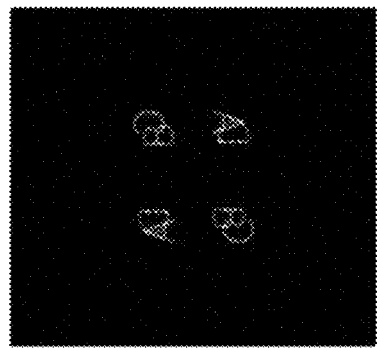
FIGS. 16A to 16E are still other diagrams illustrating the results of the examples and the comparative examples.
Figure 16D:
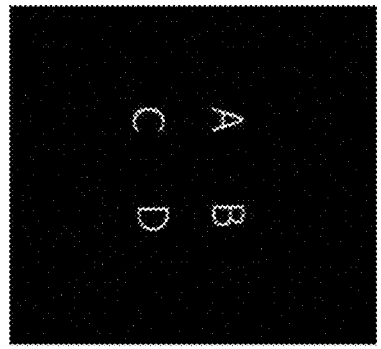
Figure 16C:
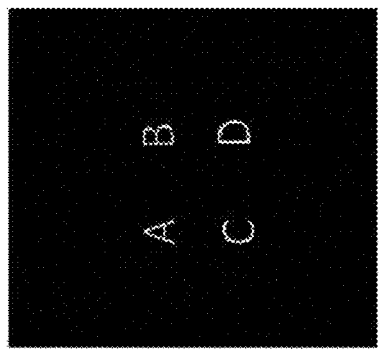
Figure 16B:
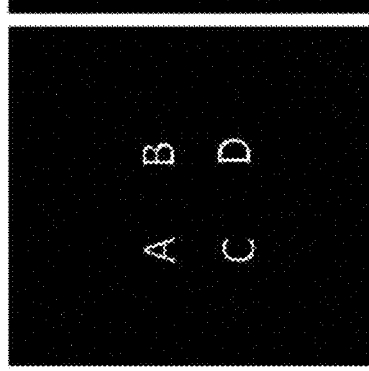
Figure 16A:
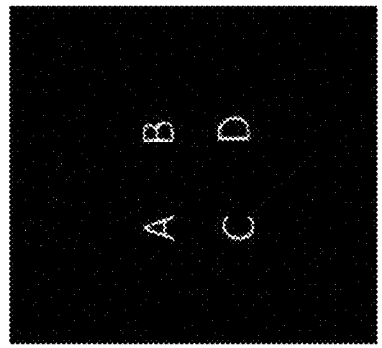
Figure 17A:
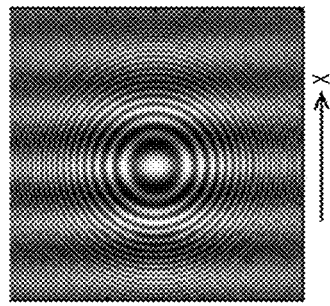
FIGS. 17A to 17E are diagrams illustrating reconstruction of an image in the technology of the related art.
Figure 17B:
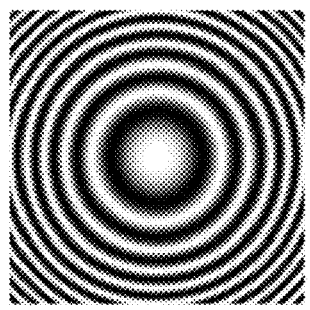
Figure 17C:
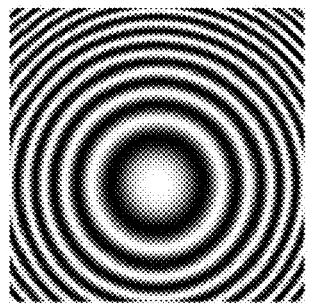
Figure 17D:
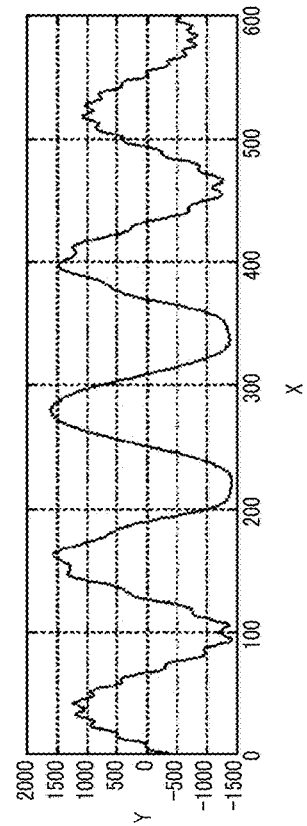
Figure 17E:
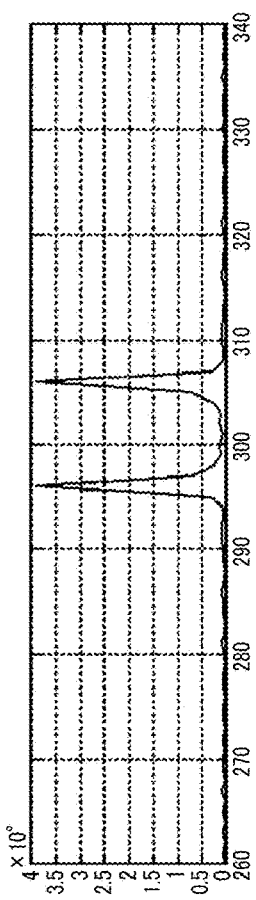
Figure 18D:
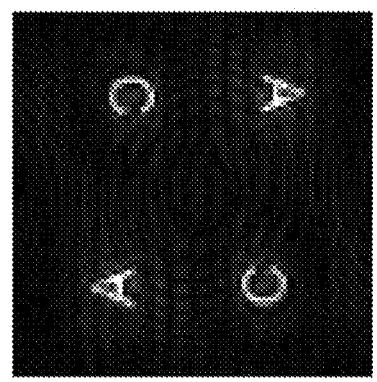
FIGS. 18A to 18D are other diagrams illustrating the reconstruction of the image in the technology of the related art.
Figure 18C:
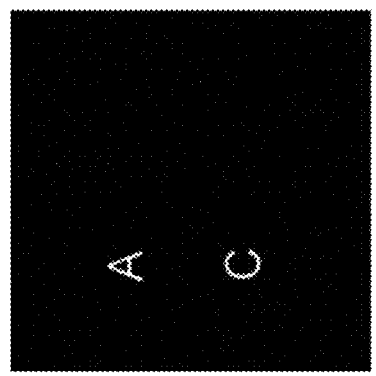
Figure 18B:
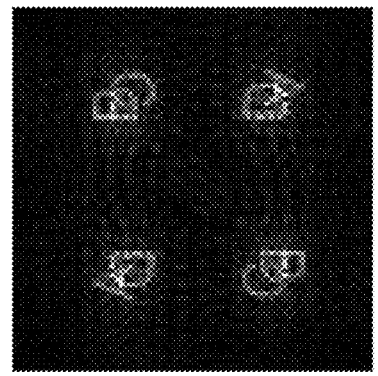
Figure 18A:
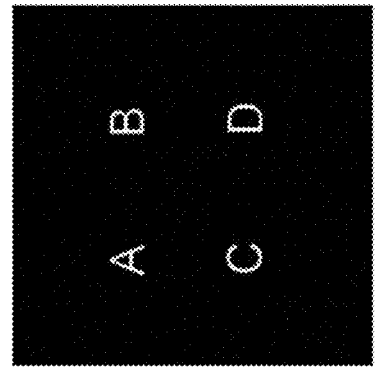

FIGS. 13A to 13G to FIGS. 16A to 16E are diagrams illustrating images reconstructed under the above conditions. FIGS. 13A to 13G correspond to Conditions 1 to 7, respectively. FIGS. 14A to 14G correspond to Conditions 8 to 14 (preferable numerical value range of the shift in phase), respectively. FIGS. 15A to 15G correspond to Conditions 15 to 21, respectively. FIGS. 16A to 16D correspond to Conditions 22 to 25 (preferable numerical value range of the shift in phase), respectively. FIG. 16E corresponds to Condition 26 (technology of the related art).

Evaluation of Examples

In Condition 8 (Example 1) to Condition 14 (Example 7) and Condition 22 (Example 8) to Condition 25 (Example 11) that satisfy a preferable range (70° to 110°) of the shift in phase between the first and second Fresnel zone patterns in the embodiment of the present invention, overlapping of the images is completely or almost not present in the reconstructed image, and a clear image is obtained. In addition, unlike the technology of the related art, it is not necessary to restrict the angle of view for obtaining a clear image. Among these examples, the clearest image is obtained in the case of Condition 11 (shift in phase is 90°). Meanwhile, in Conditions 1 to 7 (Comparative Examples 1 to 7) and Conditions 15 to 21 (Comparative Examples 8 to 14) in which the value of the shift in phase deviates from the preferable range, overlapping of the images is increased as the deviation of the value of the shift in phase from the preferable range is increased, and an unclear image is acquired. In addition, in Condition 26 (technology of the related art) in which one Fresnel zone pattern is multiplied with the projected image, overlapping of the images is significant as illustrated in FIG. 16E, and an unclear image is acquired.

Condition 17 (Comparative Example 10) and Condition 22 (Example 8) will be reviewed by comparison. In Condition 17 in which the phase of the Fresnel zone plate for imaging and the phase of the first Fresnel zone pattern (for the image of the real part) is equal, and the value of the shift in phase deviates from the preferable range, overlapping of the images occurs. Meanwhile, in Condition 22 in which the phase of the Fresnel zone plate for imaging and the phase of the first Fresnel zone pattern (for the image of the real part) are different, and the range of the shift in phase is in the preferable range, overlapping of the images does not occur. Accordingly, it is perceived that the phase of the Fresnel zone plate for imaging and the phase of the first Fresnel zone pattern do not need to be the same, and the shift in phase between the first and second Fresnel zone patterns may be approximately 90° (greater than or equal to 70° and smaller than or equal to 110°) like Conditions 8 to 14 (Examples 1 to 7) and Condition 22 (Example 8).

In a case where Conditions 22 to 24 (Examples 8 to 10) are compared, the value (90°) of the shift in phase falls in the preferable range (greater than or equal to 70° and smaller than or equal to 110°), and only the phase of the Fresnel zone plate for imaging is different in the conditions. However, in any of the conditions, overlapping of the images does not occur. Accordingly, it is perceived that the phase of the Fresnel zone plate for imaging may not be 0° (may be any phase).

In a case where Condition 11 (Example 4) and Condition 25 (Example 11) are compared, it is perceived that the image rotates in a case where the phase of the second Fresnel zone pattern (for generating the image of the imaginary part) is shifted by −90° (=)+270° from the phase of the first Fresnel zone pattern (for generating the image of the real part). Accordingly, it is perceived that a rotated image is obtained by shifting the phase as necessary.

<Others>

While embodiments and examples of the present invention are described thus far, the present invention is not limited to the embodiments and the examples. Various modifications can be made without departing from the spirit of the present invention.

EXPLANATION OF REFERENCES

10: imaging system
100: imaging module
110: Fresnel zone plate
120: imaging element
200: imaging apparatus main body
210: image processing unit
210A: projected image input unit
210B: complex image generation unit
210C: Fourier transformation unit
210D: information input unit
210E: display control unit
210F: ROM
220: storage unit
220A: projected image
220B: Fresnel zone plate information
220C: Fresnel zone pattern information
220D: complex image
220E: reconstructed image
230: display unit
240: operation unit
F: Fresnel zone plate
FZP1: Fresnel zone plate
FZP2: Fresnel zone plate
L: optical axis
SD: shadow
S100 to S140: step of image processing method
d: distance
θ: incidence angle

What is claimed is:

1. An image processing apparatus comprising:
a processor, configured to:
input a projected image formed by light incident on a Fresnel zone plate from a subject;
generate a complex image consisting of an image of a real part and an image of an imaginary part by multiplying the projected image with each of a first Fresnel zone pattern and a second Fresnel zone pattern having a same local spatial frequency in each region and a different phase of the local spatial frequency with respect to the first Fresnel zone pattern; and
reconstruct an image of a spatial domain by performing two-dimensional complex Fourier transformation on the complex image.

2. The image processing apparatus according to claim 1, wherein the phases of the local spatial frequencies of the first Fresnel zone pattern and the second Fresnel zone pattern are shifted positively or negatively in a range of greater than or equal to 70° and smaller than or equal to 110°.

3. The image processing apparatus according to claim 2, wherein the phase of the local spatial frequency of the first Fresnel zone pattern or the phase of the local spatial frequency of the second Fresnel zone pattern is the same as a phase of a local spatial frequency of the Fresnel zone plate.

4. The image processing apparatus according to claim 2, wherein the processor is further configured to generate the image of the real part by multiplying the projected image with the first Fresnel zone pattern and generate the image of the imaginary part by multiplying the projected image with the second Fresnel zone pattern.

5. The image processing apparatus according to claim 2, wherein the processor is further configured to generate the complex image by using the first Fresnel zone pattern and the second Fresnel zone pattern that have different enlargement ratios depending on a subject distance in focus.

6. The image processing apparatus according to claim 1, wherein the phase of the local spatial frequency of the first Fresnel zone pattern or the phase of the local spatial frequency of the second Fresnel zone pattern is the same as a phase of a local spatial frequency of the Fresnel zone plate.

7. The image processing apparatus according to claim 6, wherein the processor is further configured to generate the image of the real part by multiplying the projected image with the first Fresnel zone pattern and generate the image of the imaginary part by multiplying the projected image with the second Fresnel zone pattern.

8. The image processing apparatus according to claim 6, wherein the processor is further configured to generate the complex image by using the first Fresnel zone pattern and the second Fresnel zone pattern that have different enlargement ratios depending on a subject distance in focus.

9. The image processing apparatus according to claim 1, wherein the processor is further configured to generate the image of the real part by multiplying the projected image with the first Fresnel zone pattern and generate the image of the imaginary part by multiplying the projected image with the second Fresnel zone pattern.

10. The image processing apparatus according to claim 1, wherein the processor is further configured to generate the complex image by using the first Fresnel zone pattern and the second Fresnel zone pattern that have different enlargement ratios depending on a subject distance in focus.

11. The image processing apparatus according to claim 1, wherein the processor is further configured to input information of a local spatial frequency of the Fresnel zone plate, and
multiply the projected image with each of the first Fresnel zone pattern and the second Fresnel zone pattern that have the local spatial frequency based on the input information.

12. An imaging system comprising:
an imaging module that includes a Fresnel zone plate on which light from a subject is incident, and an image sensor in which a projected image is formed by the light transmitted through the Fresnel zone plate, and that acquires the projected image from the image sensor; and the image processing apparatus according to claim 1,
wherein the processor is further configured to input the projected image acquired by the imaging module.

13. An image processing method comprising:
inputting a projected image formed by light incident on a Fresnel zone plate from a subject;
generating a complex image consisting of an image of a real part and an image of an imaginary part by multiplying the projected image with each of a first Fresnel zone pattern and a second Fresnel zone pattern having a same local spatial frequency in each region and a different phase of the local spatial frequency with respect to the first Fresnel zone pattern; and
reconstructing an image of a spatial domain by performing two-dimensional complex Fourier transformation on the complex image.

14. The image processing method according to claim 13,
wherein the phases of the local spatial frequencies of the first Fresnel zone pattern and the second Fresnel zone pattern are shifted positively or negatively in a range of greater than or equal to 70° and smaller than or equal to 110°.

15. The image processing method according to claim 13,
wherein the phase of the local spatial frequency of the first Fresnel zone pattern or the phase of the local spatial frequency of the second Fresnel zone pattern is the same as a phase of a local spatial frequency of the Fresnel zone plate.

16. The image processing method according to claim 13,
wherein the image of the real part is generated by multiplying the projected image with the first Fresnel zone pattern, and the image of the imaginary part is generated by multiplying the projected image with the second Fresnel zone pattern.

17. The image processing method according to claim 13,
wherein the complex image is generated using the first Fresnel zone pattern and the second Fresnel zone pattern that have different enlargement ratios depending on a subject distance in focus.

18. The image processing method according to claim 13, further comprising:
acquiring the projected image from an image sensor by the Fresnel zone plate on which the light from the subject is incident, and the image sensor in which the projected image is formed by the light transmitted through the Fresnel zone plate,
wherein the acquired projected image is input.

19. The image processing method according to claim 13, further comprising:
inputting information of a local spatial frequency of the Fresnel zone plate,
wherein the projected image is multiplied with each of the first Fresnel zone pattern and the second Fresnel zone pattern that have the local spatial frequency based on the input information.

20. A non-transitory recording medium on which a computer-readable code of an image processing program is recorded, the image processing program causing a computer to implement:
inputting a projected image formed by light incident on a Fresnel zone plate from a subject;
generating a complex image consisting of an image of a real part and an image of an imaginary part by multiplying the projected image with each of a first Fresnel zone pattern and a second Fresnel zone pattern having a same local spatial frequency in each region and a different phase of the local spatial frequency with respect to the first Fresnel zone pattern; and
reconstructing an image of a spatial domain by performing two-dimensional complex Fourier transformation on the complex image.

* * * * *